US011278027B2

(12) United States Patent
Thomas et al.

(10) Patent No.: US 11,278,027 B2
(45) **Date of Patent: *Mar. 22, 2022**

(54) USE OF AN AMPHIDINOL FOR ITS FUNGICIDAL AND/OR BACTERICIDAL ACTIVITY ON FUNGI, OOMYCETES AND/OR PATHOGENIC BACTERIA OF PLANTS AND CROP SEEDS

(71) Applicant: Immunrise Biocontrol France, Pessac (FR)

(72) Inventors: Yann Thomas, Ermont (FR); Odon Thiebeauld, Bourg la Reine (FR)

(73) Assignee: Immunrise Biocontrol France, Pessac (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/620,047

(22) PCT Filed: Jun. 8, 2018

(86) PCT No.: PCT/EP2018/065224

§ 371 (c)(1),
(2) Date: Dec. 6, 2019

(87) PCT Pub. No.: WO2018/224675

PCT Pub. Date: Dec. 13, 2018

(65) Prior Publication Data

US 2020/0100499 A1 Apr. 2, 2020

(30) Foreign Application Priority Data

Jun. 8, 2017 (FR) ...................................... 1755115

(51) Int. Cl.
*A01N 43/16* (2006.01)

(52) U.S. Cl.
CPC .................................... *A01N 43/16* (2013.01)

(58) Field of Classification Search
CPC ......... A01N 31/04; A01N 31/06; A01N 43/16
See application file for complete search history.

(56) References Cited

U.S. PATENT DOCUMENTS 8,815,565 B2 * 8/2014 Han .................... C12N 5/0602
435/243

FOREIGN PATENT DOCUMENTS

WO WO 2017/211998 12/2017

OTHER PUBLICATIONS

Nuzzo (J. Nat. Prod. 2014, 77, 1524-1527), or Echigoya (Harmful Algae 4 (2005) 383-389).*

(Continued)

*Primary Examiner* — Valerie Rodriguez-Garcia
(74) *Attorney, Agent, or Firm* — Panitch Schwarze Belisario & Nadel LLP

(57) ABSTRACT

Use of the molecule with the following formula (I) for its fungicidal and/or bactericidal activity on fungi, oomycetes and/or pathogenic bacteria of plants and crop seeds.

(I)

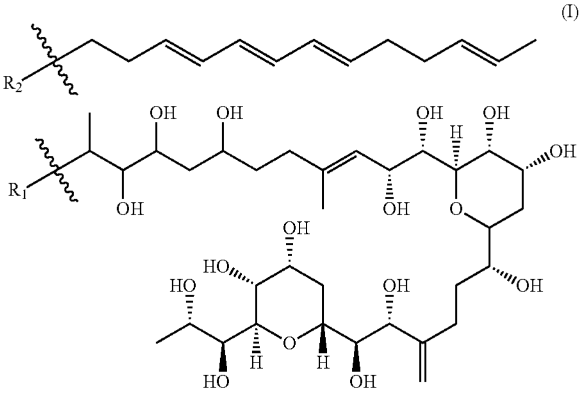

10 Claims, 5 Drawing Sheets

(56) References Cited

OTHER PUBLICATIONS

Figure 1:
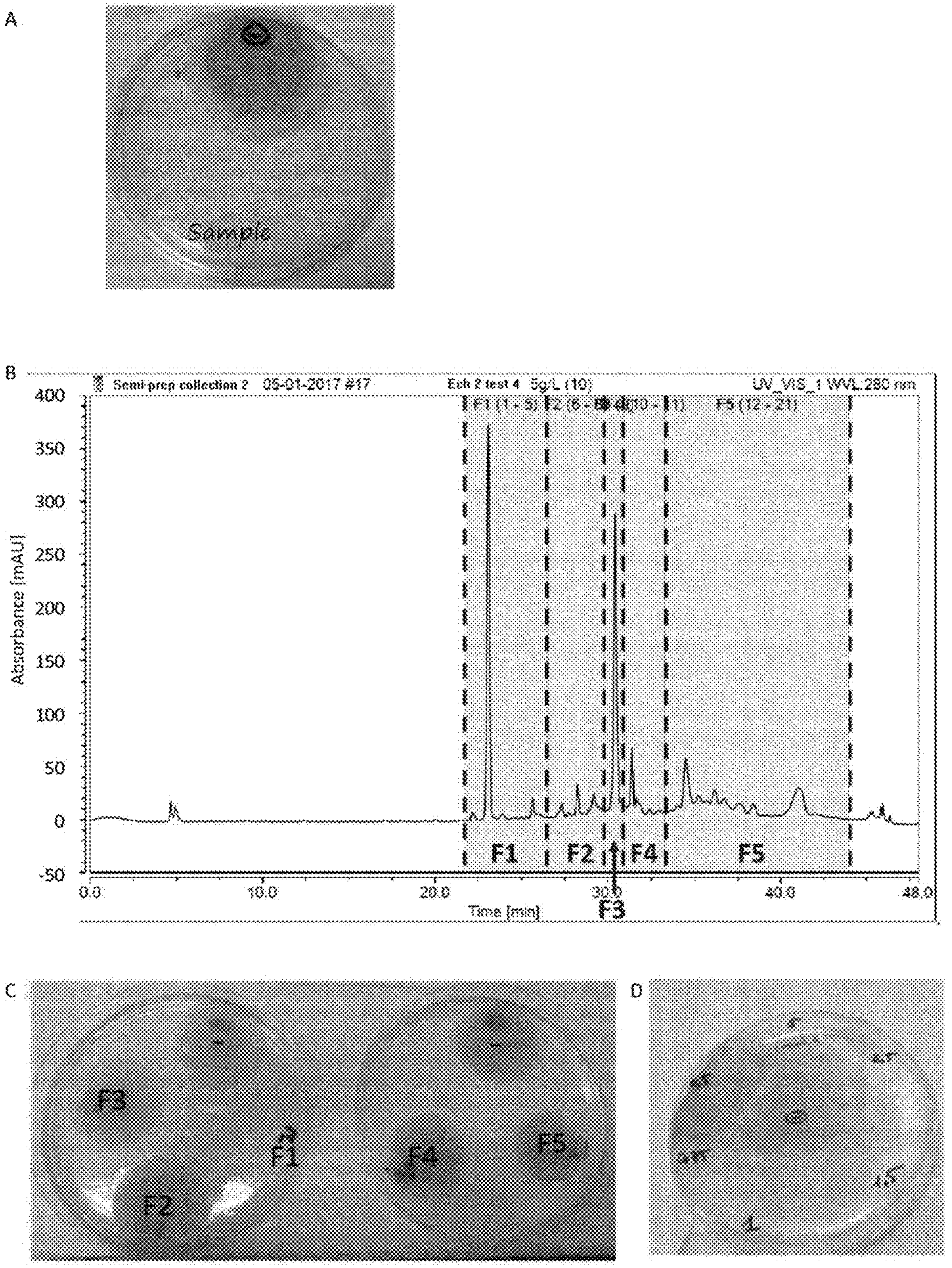

Satake (J. Am. Chem. Soc. 1991, 113, 9859-9861).*
Echigoya (Harmful Algae 4 (2005) 383-389).*
Serfling (Antimicrobial Agents and Chemotherapy, Oct. 2007, p. 3672-3676).*
Perrone et al. (Studies in Mycology 59: 53-66 (2007)).*
E. Arseniuk et al., Fusarium Head Blight Reactions and Accumulation of Deoxynivalenol (DON) . . . , 147 J. Phytopathology 577-590 (1999).
P. Devi et al., Screening marine organisms for antimicrobial activity against clinical pathogens, 40(3) Indian Journal of Geo-Marine Sciences 338-346 (Jun. 2011).
R. Echigoya et al., The structures of five new antifungal and hemolytic amphidinol analogs from Amphidikium carterae collected in New Zealand, 4 Harmful Algae 383-389 (2005).
A. Mayer et al., Marine Pharmacology in 2009-2011: Marine Compounds with Antibacterial, Antidiabetic, Antifungal, Anti-Inflammatory, . . . , Mar. 11 Drugs 2510-2573 (2013).
Y. Meng et al., Structure and Biosynthesis of Amphidinol 17, a Hemolytic Compound from Amphidium carterae, 73 J. Nat. Prod. 409-415 (2010).
N. Morsy et al., Structures of new amphidinols with truncated polyhydroxyl chain and their membrane-permeabilizing activities, 14 Bio. & Medicinal Chemistry 6548-6554 (2006).
S. Murray et al., Genetic Diversity, Morphological Uniformity and Polyketide Production in Dinoflagellates (Amphidinium, Dinoflagellata), 7(6) PLoS One e38253 (Jun. 2012).
G. Nuzzo et al., Antifungal Amphidinol 18 and Its 7-Sulfate Derivative from the Marine Dinoflagellate Amphidinium carterae, 77 J. Nat. Prod. 1524-1527 (2014).
K. Washida et al., Karatungiols A and B, two novel antimicrobial polyol compounds, from the symbiotic marine dinoflagellate . . . , 47 Tetrahedron Letters 2521-2525 (2006).
C. Bowler et al., Oceanographic and Biogeochemcial Insights from Diatom Genomes, 2 Ann. Rev. Mar. Sci. 333-365 (2010).

* cited by examiner

A

B

USE OF AN AMPHIDINOL FOR ITS FUNGICIDAL AND/OR BACTERICIDAL ACTIVITY ON FUNGI, OOMYCETES AND/OR PATHOGENIC BACTERIA OF PLANTS AND CROP SEEDS

CROSS-REFERENCE TO RELATED APPLICATIONS

This application is a U.S. National Stage Application pursuant to 35 U.S.C. § 371 of International Patent Application PCT/EP2018/065224, filed on Jun. 8, 2018, and published as WO 2018/224675 on Dec. 13, 2018, which claims priority to French Patent Application 1755115, filed on Jun. 8, 2017, all of which are incorporated herein by reference in their entireties for all purposes.

The invention relates to the field of antifungal and antibactericidal agents for seeds.

In order to cope with world population growth, the period following the Second World War saw the advent of the "Green Revolution", a set of modern programmes concerning varietal selection, irrigation, fertilizers and synthetic pesticides, the purpose of which was to control soil fertility and pathogenic organisms. These various elements have thus made it possible to almost triple global food production in the space of some forty years. Today, the agricultural challenge is to feed 9 billion people by 2050 and to continue to increase production per unit area in the context of increasingly limited resources and increasing constraints. For example, potential losses due to biotic stresses and the absence of crop protection methods could amount to more than half of cereal production. To limit losses, conventional plant protection products are thus an integral part of crop protection worldwide. However, these chemicals have a strong negative impact on human health and the environment, leading to the use of other means of controlling infectious diseases, such as biocontrol (all the plant protection methods using natural mechanisms). The object of this patent is to exploit unicellular algae, derived from phytoplankton, as a source of new natural molecules capable of acting as an "organic pesticide" by directly affecting the survival of phytopathogens infecting crops of major agronomic importance, such as wheat and grapevine.

*Fusarium* Diseases

In Europe, several diseases affecting wheat (*Triticum aestivum*) are responsible for yield losses and lower health quality of grains. One of the most important is *Septoria* leaf blotch (*Septoria* spp.). *Fusarium* wilt is associated with a species complex consisting of two genera of phytopathogenic fungi, *Fusarium* and *Microdochium* (1). These two genera include about 19 species capable of inducing *Fusarium* head blight in wheat. The most common species in Europe are *F. graminearum, F. culmorum, F. avenaceum, F. poae, M. nivale* and *M. majus*. The genus *Fusarium* belongs to the division Ascomycota and the family Nectriaceae. The genus *Microdochium* belongs to the family Tuberculariaceae and includes two species, *M. nivale* and *M. majus*, causing the same symptoms on the ear and leaves as *Fusarium*. Several *Fusarium* species, of which *Fusarium graminearum* is the most represented, can be found together in a given region or plot or ear, thus forming the *Fusarium* complex. The severity, incidence and prevalence of each species vary by geographical location, climatic variations and cultural practices. The presence of several of these species on the same ear is likely to modify their equilibrium and their toxin production dynamics.

*Fusarium* head blight of wheat can devastate a crop a few weeks before harvest. It may be associated with high yield losses (grain abortion and low weight), a reduction in germinative quality or a decrease in quality due to the presence of toxins in the grains. Indeed, fungi of the genus *Fusarium*, but not of the genus *Microdochium*, are capable of producing toxic secondary metabolites, mycotoxins, whose presence increases the incidence of the disease on agricultural production and constitutes a major economic and public health problem. The main means of controlling *Fusarium* wilt include cultivation practices, varietal resistance and chemical control. At present, few wheat varieties are resistant to *Fusarium* wilt. However, there are tolerant varieties with partial resistance levels that limit yield losses and toxin accumulation in harvests. Once the crop is established, chemical control is possible but of limited efficacy. The diversity of pathogens and their different sensitivity to active substances complicate this control. For example, fungi of the genus *Fusarium* are sensitive to triazoles while fungi of the genus *Microdochium* are sensitive to strobilurins.

*Septoria* Diseases

*Septoria* blotch is a wheat disease which is responsible for significant yield losses and causes the most economic losses worldwide, notably in humid temperate regions. Two main forms of *Septoria* blotch can be distinguished: glume blotch (*Phaeosphaeria nodorum*) and leaf blotch (*Mycosphaerella graminicola*). In France, glume blotch is mainly present in continental areas, while leaf blotch is mainly present in the north-west and coastal regions where the fungus finds climatic conditions favourable to its development. Symptoms caused by *M. graminicola* appear successively in the form of chlorosis, light green spots, before evolving into brownish spots called necrotic lesions. These necrotic lesions eventually merge (coalescence). Next, pycnidia, black fruiting bodies barely visible to the naked eye, appear on these necrotic lesions. The harmfulness of *Septoria* blotch in terms of loss of photosynthesis, growth or yield has been studied by several research teams. A qualitative harmfulness expressing the impact of the disease on the protein content of harvested grains can thus be established.

*M. graminicola* is a hemibiotrophic fungus that establishes a first biotrophic phase where infection occurs on living tissues followed by the necrotrophic phase during which the fungus expresses toxins producing death of colonized tissues. Depending on environmental conditions, *M. graminicola* reproduction is either sexual (ascospore production) or asexual (pycnidiospore production). Ascospores, spread by wind over long distances, contribute to the survival of the fungus in the absence of a host plant and are considered the main source of primary inoculum to initiate the disease. Pycnidiospores, in turn, are mostly produced during the epidemic phase of the disease over several successive infectious cycles. These spores are splash-dispersed over short distances by the action of raindrops. The decrease in potential yields is all the greater as the last leaves under the ear involved in grain filling are severely affected by the disease. Yield losses due to *Septoria* blotch have been estimated at 1-2 $t \cdot ha^{-1}$ on average, with cases of up to 3-3.5 $t \cdot ha^{-1}$, representing a 40% decrease in yields.

Methods for controlling *M. graminicola* are based on the use of fungicides and resistant cultivars. However, in recent years there has been a significant loss in fungicide efficacy due to a strong selection of pathogens with, for example, resistance to the family of strobilurins as well as a recent loss in the field efficacy of triazoles.

Grapevine Diseases

Today, the grapevine is grown worldwide and plays a central role in the economies of many countries. It is consumed as table grapes and juice, but its main exploitation rests on the wine industry. The European Union is the world's largest wine producer and the world's largest exporter of wine products. The sector thus contributes around 15 billion euros per year to the European Union economy (www.ceev.be). In 2010, French vineyards covered nearly 865 000 hectares, or nearly 3% of arable land, and made France the world's leading wine producer with 51.1 million hectolitres. Grapevines must cope with many pathogenic attacks, including cryptogamic diseases. When they affect the lignified parts of the plant they are referred to as "wood disease", notable examples being esca, black dead arm and eutypiosis. Fungi that infect berries and herbaceous parts of the grapevine (leaves, stems, etc.) induce "cryptogamic diseases of the foliage" including grey rot, black rot, downy mildew and powdery mildew.

Esca

While downy mildew, powdery mildew and grey rot are the three main cryptogamic diseases affecting vineyards worldwide, wood diseases caused by fungal agents are becoming limiting factors in grape production. Winegrowers are currently confronted with two major problems concerning these wood diseases: the lack of control methods and a profound lack of knowledge of the various biotic and abiotic factors.

The most common fungal species worldwide for esca disease are the ascomycetes *Dipodia seriata, Dipodia mutila, Neofusicoccum parvum* and *Neofusicoccum luteum*. In France, the most isolated species are *Diplodia seriata* and *Botryosphaeria dothidea*. Many other fungi, including some pathogens, are frequently isolated from wood necrosis in plants with esca. This is the case of *Eutypa lata*, the agent responsible for eutypiosis. This disease has two forms: the slow form and the apoplectic form. Foliar symptoms are characteristic of the slow form even though they may be present in the apoplectic form. The slow form is characterized by specific foliar colourings: yellowish interveinal spots on white grape varieties and red-bordered interveinal spots on black grape varieties, the veins remaining green. These spots gradually evolve into browning and drying. Foliar symptoms of the slow form can be visible one year on a grapevine stock and disappear the next year. The apoplectic form is characterized by a rapid drying of the aerial organs, twigs, leaves and bunches of part or all of the grapevine stock. This symptom usually occurs when summers are hot, resulting in the death of the grapevines in only a few days without warning symptoms. The variety of inoculum sources and the very slow and invisible development of fungi in grapevine wood make it very difficult to implement control methods. In addition, changes in the regulation of plant protection products at the European level have led to the banning of sodium arsenite based chemicals because of the carcinogenic effects on humans and the high toxicity of these products to the environment. A great deal of research is being carried out throughout the world to test new molecules that can be used in nurseries or vineyards.

Grey Rot

Grey rot is a cryptogamic disease caused by an ascomycete fungus called *Botrytis cinerea*. It belongs to the class Leotiomycetes, the order Helotiales and the family Sclerotiniaceae. *B. cinerea* is a necrotrophic fungus capable of colonizing healthy, already infected plant tissues as well as dead tissues (saprophytism). On the leaf, symptoms appear as brown spots with greyish felting on the underside (fruiting of the fungus) that tend to increase and invade the entire leaf blade. The bunches can be affected before flowering and dry out. They are especially sensitive at the veraison stage where there is development of a brown colouring of the berries of the white grape varieties and the appearance of a thick grey felt. Conidia are spread by wind and enter herbaceous organs directly or through wounds. This is why the bursting of the berries due to downy mildew favours infections by *B. cinerea*. This disease not only causes yield losses of up to 40% (Viniflhor, 2006 data) but also degrades the organoleptic qualities of wines. Nevertheless, *Botrytis cinerea* is also responsible for the "noble rot" necessary to obtain certain sweet wines.

Downy Mildew

The two diseases that currently affect vineyards most severely are downy mildew and powdery mildew. The agent responsible for downy mildew, the oomycete *Plasmospora viticola* belonging to the order Peronosporales, is an obligate parasite; to stay alive and multiply, it is obligated to propagate on surviving grapevine leaves. *P. viticola* attacks all herbaceous tissues of the grapevine as well as the bunches. It causes defoliation, browning and drying of berries and stems. In the absence of treatment and under favourable climatic conditions, downy mildew can devastate up to 75% of the season's harvest.

The life cycle of *P. viticola* includes a sexual and an asexual phase. The asexual phase leads to the production of spores necessary for secondary infections and for dispersal of the pathogen over a short distance, while the sexual phase produces quiescent and cold-resistant oospores enabling overwintering and primary infections. The first macroscopic evidence of downy mildew in a vineyard is the appearance of pale yellow, irregular spots (oil spots) expanding on the upper or adaxial surface of the leaves. As the internal colonization of the mycelium progresses, the development of white cottony growths on the underside in correspondence with the oil spots becomes more pronounced. In advanced infections these symptoms are accompanied by dead brown tissue. Downy mildew is mainly controlled by preventive measures using fungicide sprays. While it is possible to stop an attack, the damage, once caused on inflorescences and clusters, is irreparable.

Powdery Mildew

Grapevine powdery mildew (*Erysiphe necator*) is an obligate biotrophic ascomycete belonging to the order Erysiphales. The fungus colonizes the surface of all the green organs of the grapevine, especially the upper surface of the leaves, and spreads to the berries. A sexual phase characterized by the production of cleistothecia containing ascospores may alternate with an asexual phase leading to the formation of conidiophores bearing conidia. During the winter resting phase of the grapevine, the fungus survives as hyphae in the dormant buds or as cleistothecia on the surface of the plant. The spores contained in the cleistothecia will be released in the spring to germinate on the surface of buds and young leaves. A primary hypha develops on the leaf surface, then an increasingly complex and branched mycelial network covers the leaf surface. Subsequently, conidiophores differentiate from the mycelium at the beginning of the sporulation stage and colonize other green tissues of the plant leading to secondary infections.

The presence of mycelium and conidiophores carrying conidia on the surface of infected host tissues gives a greyish-white powdery appearance. White felting develops on the flower buds, which dry out. Only young berries with a sugar content of <8% are susceptible to powdery mildew. All leaf surfaces can be susceptible to infection, regardless of their age. Young infected leaves first turn dark green and then deform and become stunted. The upper surface of the leaves may have lighter, chlorotic spots similar to the oil spots of downy mildew. At present, the main means of controlling the diseases that affect vineyards most severely is the use of large amounts of pesticides and fungicides. Sanitary pressure is therefore particularly strong in viticulture.

Fungicidal treatments intended to control mainly downy mildew and powdery mildew are applied on a precise schedule to prevent damage due to the appearance of disease. The European Union (EU) uses about 68 000 tonnes of fungicides per year to control grapevine diseases, which represents 65% of the fungicides used in agriculture, while only 3.3% of the EU's useful agricultural area is occupied by grapevines (Eurostat, 2007). In order to limit the strong pressure of chemicals on the environment and health, it is necessary to isolate molecules of natural origin that will play a role in protecting crops against infectious diseases in order to eventually replace the chemical plant protection products used to date.

Apple Scab

Scab, along with brown rot and powdery mildew, is one of the main fungal diseases of apple trees (genus *Malus*). It is caused by an ascomycete fungus called *Venturia inaequelis*, of which there are several thousand strains, causing black or brown lesions on the surface of leaves, buds or fruits and sometimes even on the wood. Fruits and the lower part of the leaves are particularly sensitive to it.

The fungus overwinters on the leaves that fall from infected trees, in the form of perithecia. In spring, when the buds open, the perithecia fill with ascospores. Ascospores are ejected into the air of the orchard on humid days and reach the trees through air movement. This ascospore discharge begins at bud burst and continues for 6 to 10 weeks, most often until the end of June. When the ascospores reach the foliage and the leaves are wet for a period of time, they germinate and penetrate the leaves, resulting in a primary infection. Depending on humidity and temperature conditions, the fungal infection becomes visible in one to three weeks on the different parts of the tree. Dark olive or brown spots of about 5 mm appear on the leaves and may sometimes cover the entire leaf. Infected flowers may fall off. Fruit infection is first identified by grey spots on the stem.

Following the primary infection and for the rest of the summer, the fungus develops and produces conidia, which are another form of reproductive structure. When the conidia escape, there is a secondary infection. The conidia can infect any part of the tree and those produced in late summer can even grow on stored fruit. Heavy rain disperses the conidia.

The disease rarely kills its host but can significantly reduce (up to 100%) fruit quality and production in the absence of fungicide treatment. After the preventive measures of collecting fallen leaves in the fall, the control strategy requires effective action in the spring to prevent released spores from infecting or developing on the trees. The traditional method of protection was to start fungicide application at bud burst and repeat applications every seven days or so until late June to protect new shoots. Apple orchards are the most heavily treated with fungicides and insecticides with an average of 28.8 fungicide treatments per year, 19 of which are dedicated to scab (INRA data).

Microalgae

Molecules of natural origin having a new mechanism of action and capable of circumventing the resistance developed by pathogens have a major future for the development of new environmentally friendly plant protection products. The oceans represent a considerable variety of organisms (bacteria, microalgae, algae, vertebrate and invertebrate animals) which are a source of new bioactive molecules and which are still under-exploited (2). For example, marine microorganisms accumulate bioactive secondary metabolites whose unique structure is not found in terrestrial organisms. These metabolites therefore potentially represent new molecules of interest. Some substances derived from marine organisms have been described as having antifungal activity or natural defence substance activity, but the search for these molecules is still very underdeveloped (3).

Microalgae are unicellular organisms that play a key role in aquatic ecosystems. Producing organic material, they play an important ecological role as they represent the bottom of the marine environment food chain. However, their incredible ability to colonize all the world's oceans suggests that they have probably developed effective strategies to control pathogens, notably via the production of natural pesticides. For example, the abundant proliferation in coastal areas of microalgae producing biotoxins is responsible for the formation of harmful algal blooms (HABs) with a significant impact on the trophic cascade.

Among microalgae, dinoflagellates, belonging to the order Gymnodiniales and the family Gymnodiniacae, are present in temperate and tropical marine waters living in free form or in symbiosis with invertebrates (for example, corals). Dinoflagellates synthesize a large number of secondary metabolites called polyketides (compounds with biological or pharmacological activity that may be toxic to confer a survival advantage), several of which have been characterized, including those responsible for HABs (4). For example, the model species of dinoflagellates, *Amphidinium carterae*, produces a profusion of different bioactive compounds, many of which have the potential to be developed as therapeutic agents (5). The polyketides produced by *Amphidinium* species are extremely diverse in structure and form three categories: macrolides, linear polyketides and long-chain polyketides. For example, amphidinols are polyhydroxy-polyenes (long-chain polyketides) that have strong anti-fungal and haemolytic activity. They thus increase membrane permeability by associating with membrane lipids (6). Among the different *Amphidinium* strains, amphidinol-like compounds with a long polyhydroxy chain have been isolated, such as lingshuiols, karatungiols, carteraol E, luteophanols, colopsinols, and amphezonol A (5).

In order to limit the strong pressure of chemicals on the environment and health, it is necessary to isolate molecules of natural origin that will play a role in protecting crops against infectious diseases in order to eventually replace the chemical plant protection products used to date. These "organic pesticides" could thus directly affect the survival of phytopathogens of crops of major agronomic importance, such as wheat and grapevine.

Surprisingly, the inventors identified that one of the molecules responsible for the fungicidal effect of a cellular extract of *Amphidinium carterae* on many plant pathogenic fungi is amphidinol 18.

SUMMARY OF THE INVENTION

A first object of the invention concerns the use of the molecule of the following formula (I):

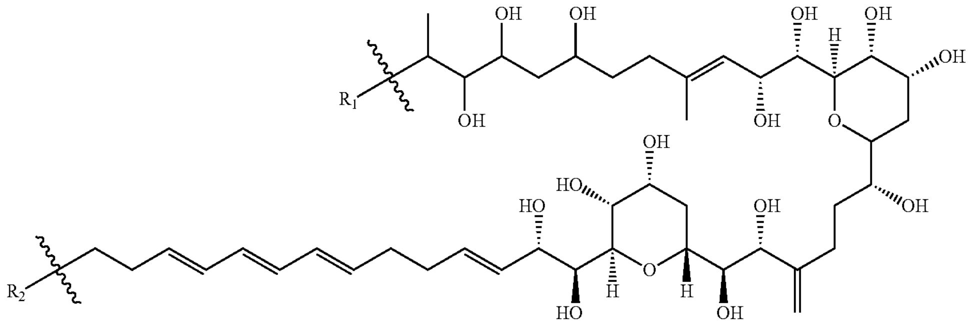

wherein:

$R_1$ is selected from the group consisting of:

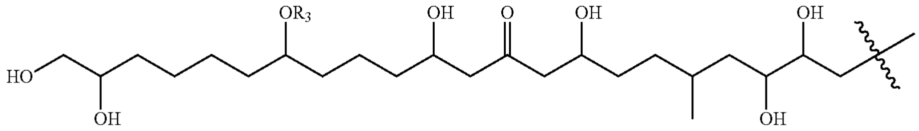

,

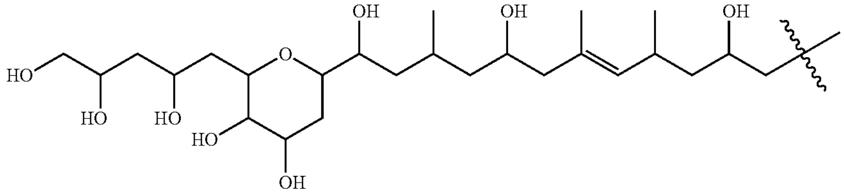

,

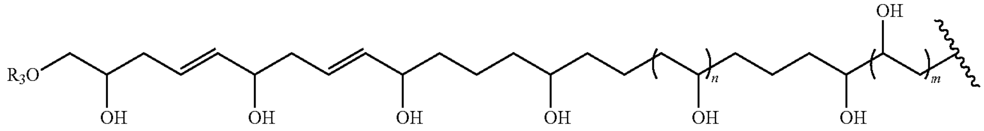

,

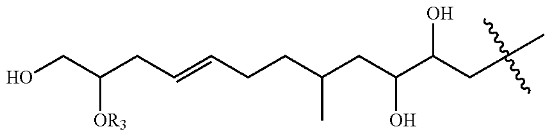

,

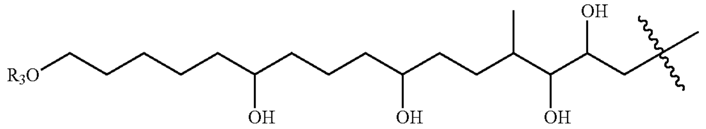

and

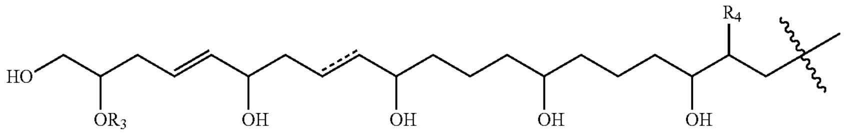

;

where:

$R_3$ represents H or $SO_3Na$, $R_4$ is H or OH,

 represents a single or double bond, n is equal to 0 or 1 and m is 0 or 1; and $R_2$ is selected from the group consisting of:

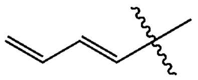

and

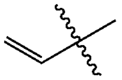

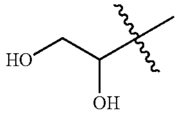

for its fungicidal and/or bactericidal activity on fungi, oomycetes and/or pathogenic bacteria in plants and seeds.

Another object of the invention relates to a process for controlling crop plant and seed pathogenic fungi, oomycetes and/or bacteria comprising applying to crop plants and/or coating said seeds with the molecule of formula (I).

FIGURE LEGENDS

FIG. 1. Fractionation of extract D on reversed-phase C18 column and activity test of the different fractions of extract D obtained by HPLC A. In vitro test of *F. graminearum* growth inhibition by extract D at 5 g/L obtained after methanol extraction B. Liquid chromatogram obtained after injection of extract D. The samples were assembled according to the dotted lines to form 5 fractions, denoted F1 to F5.

Figure 2:
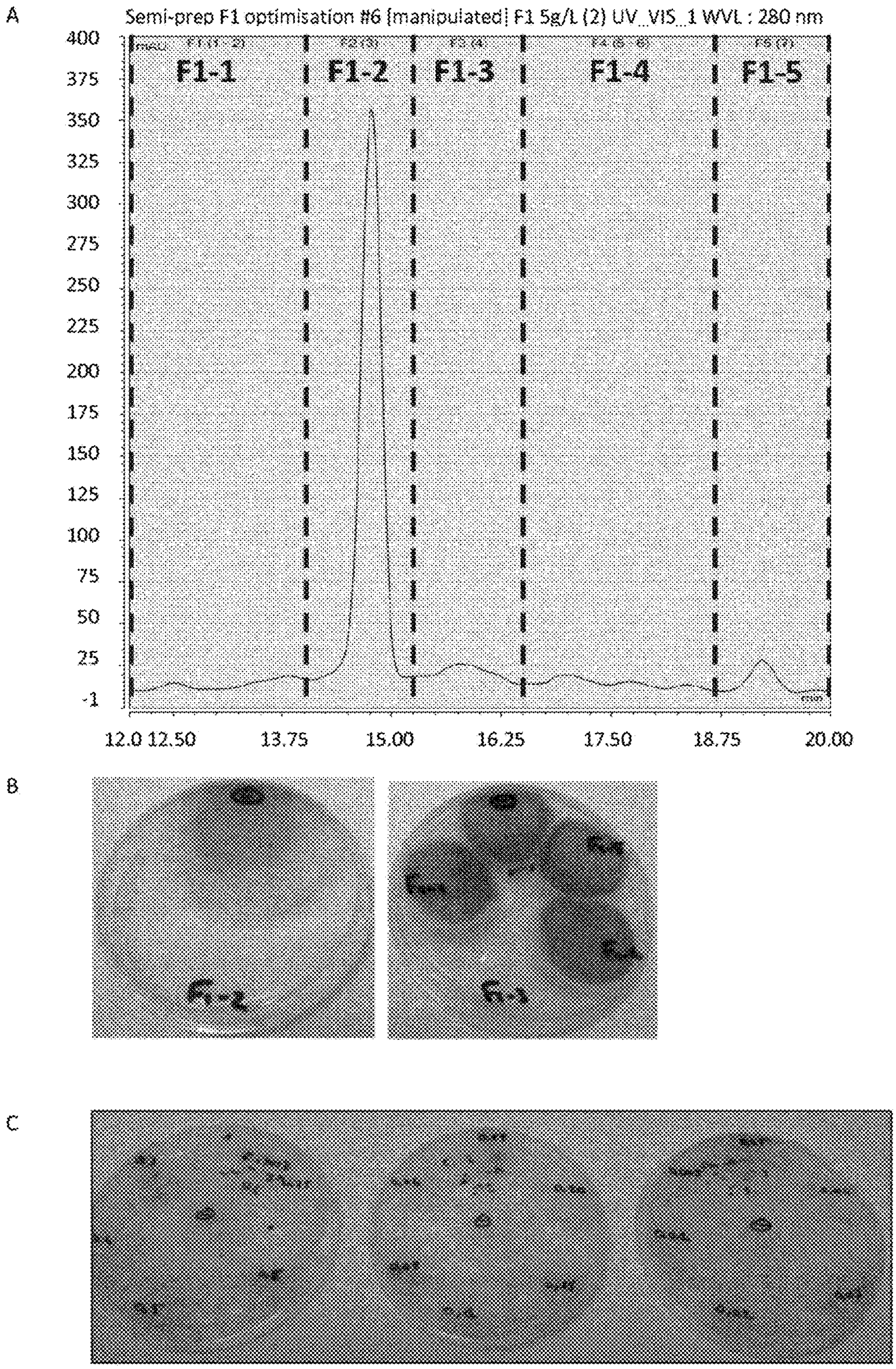

C. In vitro test of *F. graminearum* growth inhibition by fractions F1 to F5 at a concentration of 5 g/L D. In vitro test of *F. graminearum* growth inhibition by fraction F1 at a concentration of 0.5 g/L, 0.75 g/L, 1 g/L, 1.5 g/L, 2.5 g/L, and 5 g/L −: negative control: spores are incubated in the presence of the buffer alone FIG. 2: Fractionation of fraction F1 on reversed-phase C18 column and activity test of the different fractions obtained by HPLC A. Liquid chromatogram obtained after injection of fraction F1. The samples were assembled according to the dotted lines to form 5 fractions, denoted F1-1 to F1-5.

Figure 3:
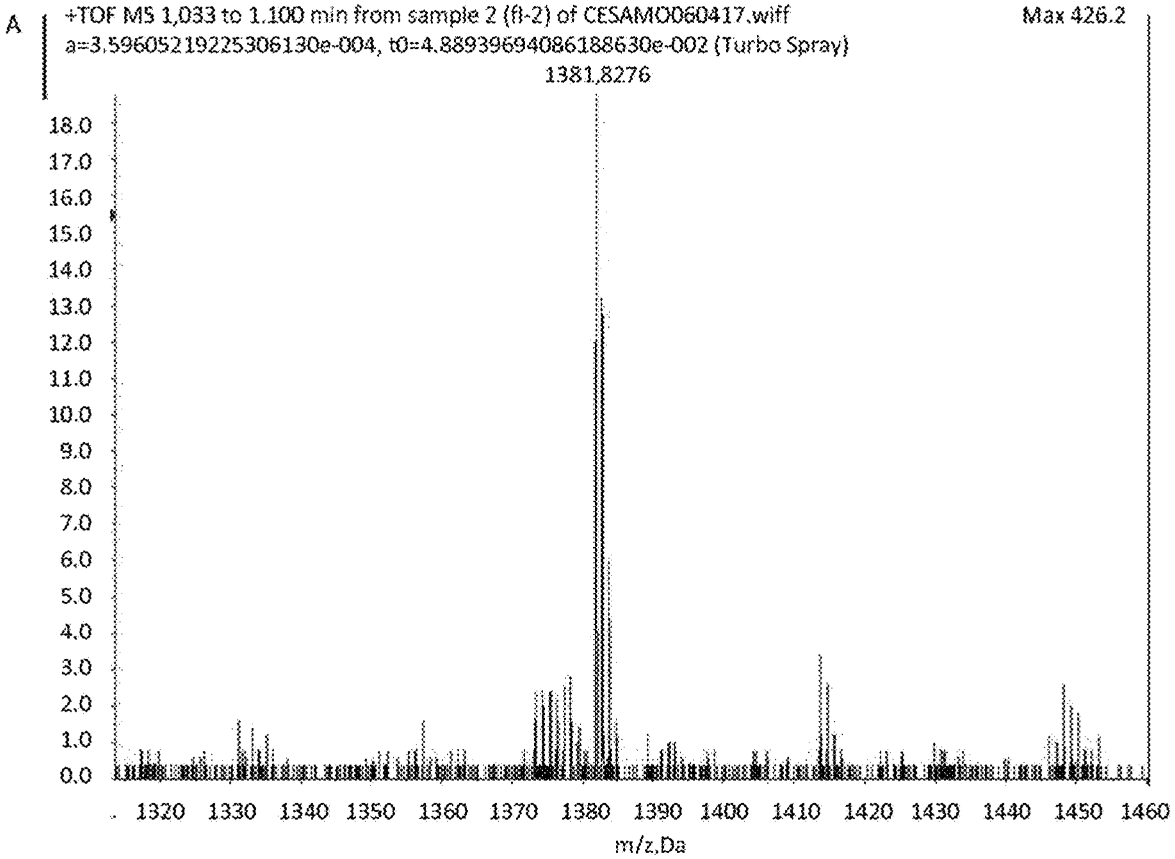
Figure 3:
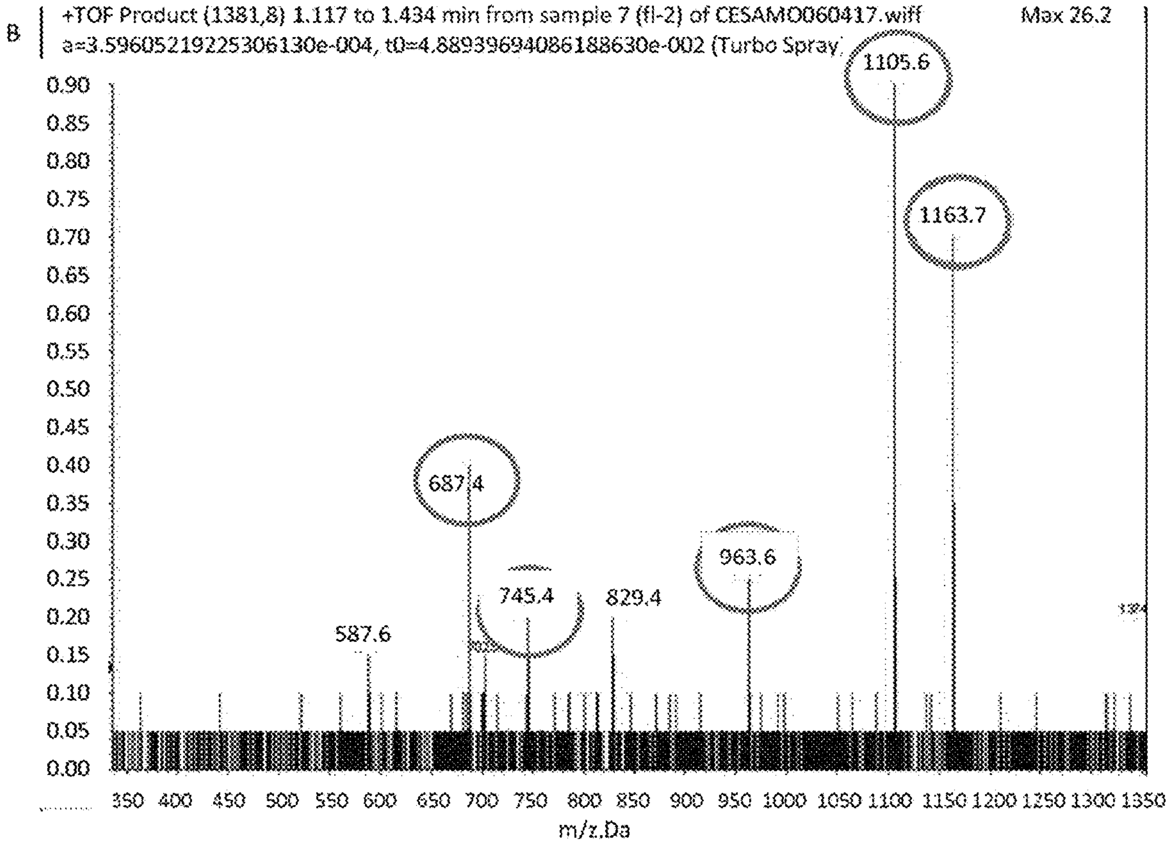

B. In vitro test of *F. graminearum* growth inhibition by fractions F1 to F5 at a concentration of 5 g/L C. In vitro test of *F. graminearum* growth inhibition by fraction F1-2 at concentrations ranging from 0.0005 g/L to 1 g/L −: negative control: spores are incubated in the presence of the buffer alone FIG. 3. Mass spectrometry analysis of fraction F1-2.

A. Mass spectrum acquired by positive-mode electrospray ionization on the molecule of interest collected F1-2

B. Tandem mass spectrum of the 1381.8276 Da ion detected in A. The circled peaks are consistent with those found in AM18 characterized by Nuzzo et al., 2014 (7)

Figure 4:
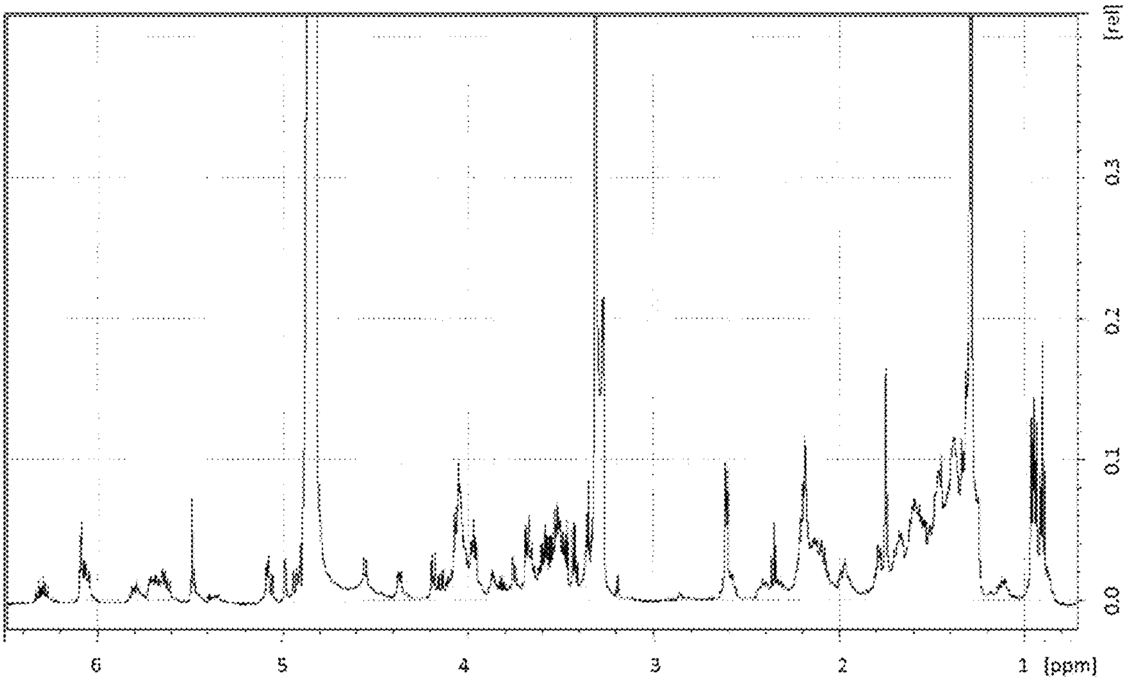
Figure 4:
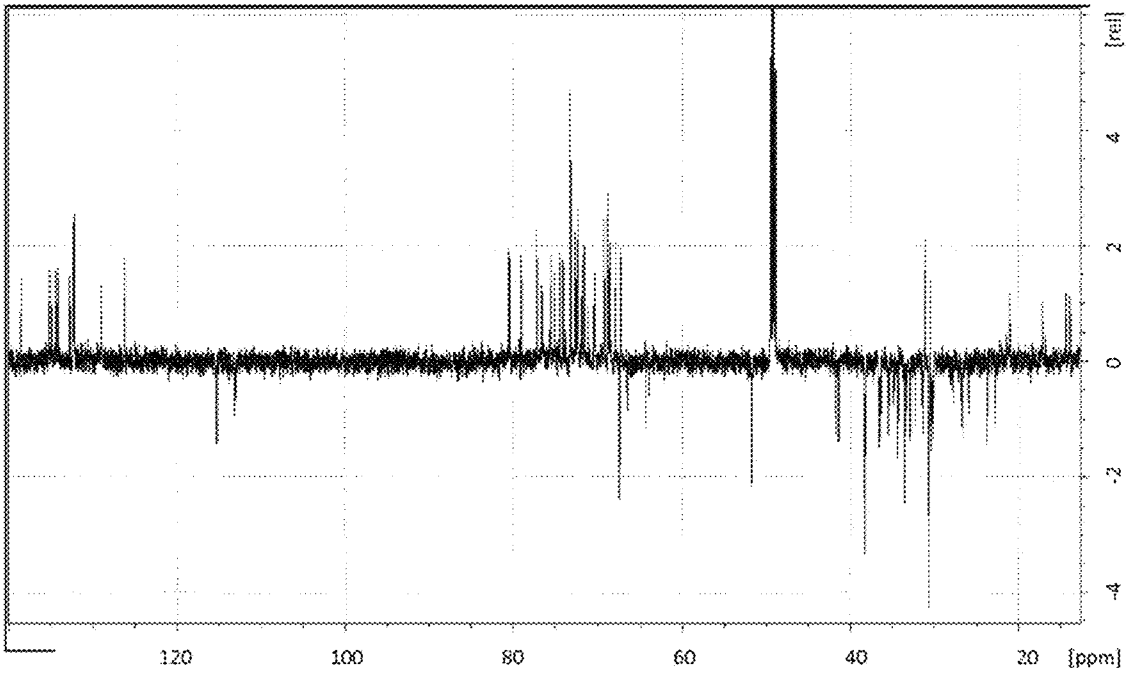

FIG. 4. NMR analysis of fraction F1-2.

Figure 5:
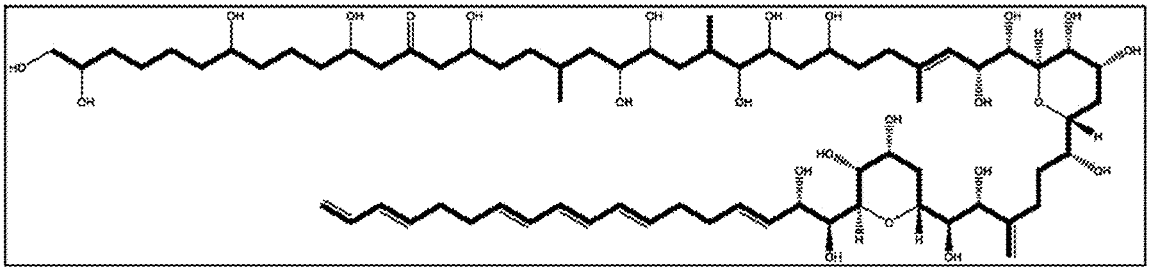

A. $^{1}H$ NMR spectrum ($MeOD_4$ solvent) obtained for the molecule of fraction F1-2 derived from extract D B. $^{13}C$ DEPT135 NMR spectrum ($MeOD_4$ solvent) obtained for the molecule of fraction F1-2 derived from extract D FIG. 5. Structural formula of the amphidinol 18 molecule, derived from fraction F1-2 of extract D All COSY and TOCSY correlations between each of the protons are shown in bold.

DETAILED DESCRIPTION OF THE INVENTION

A first object of the invention relates to the use of the molecule of the following formula (I):

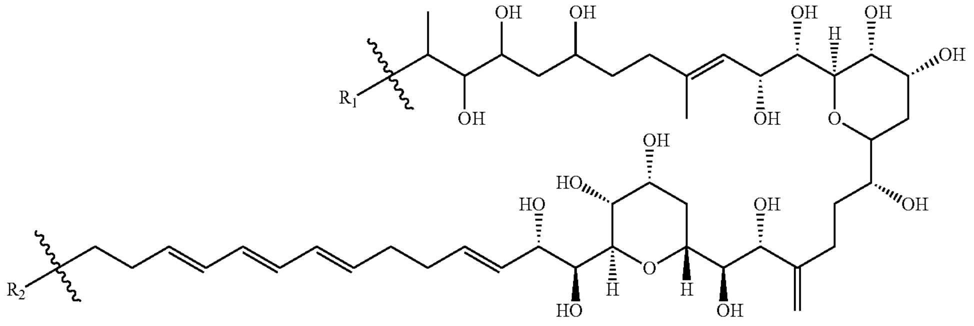

wherein:

$R_1$ is selected from the group consisting of:

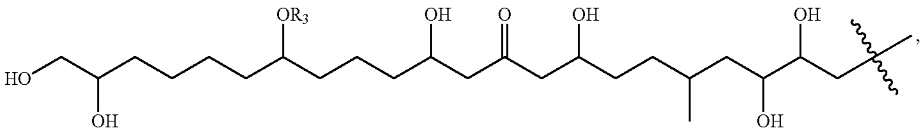,

-continued
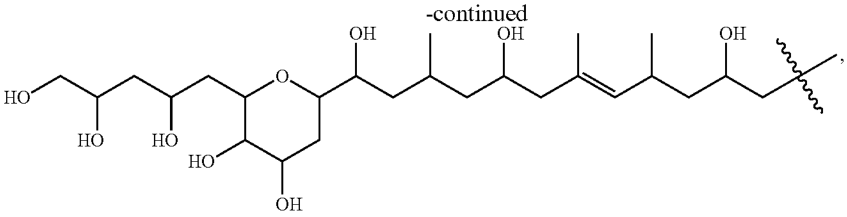
,
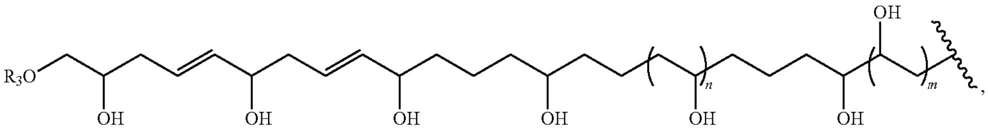
,
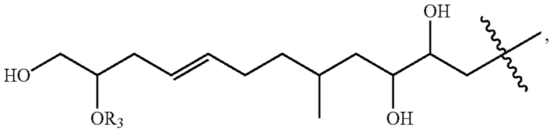
,
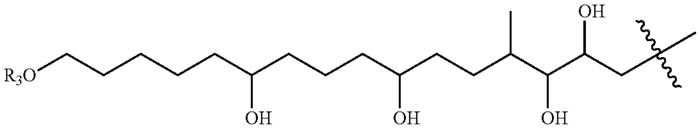
and
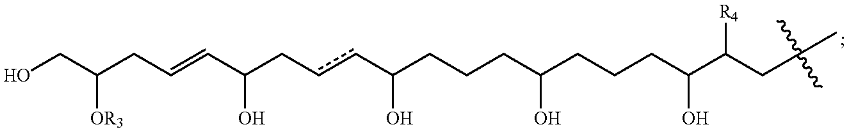
;
where:
$R_3$ represents H or $SO_3Na$,
$R_4$ is H or OH,
 represents a single or double bond,
n is equal to 0 or 1 and
m is 0 or 1; and
$R_2$ is selected from the group consisting of:
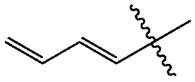
and
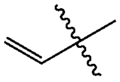
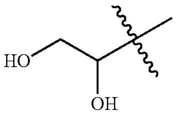
for its fungicidal and/or bactericidal activity on fungi, oomycetes and/or pathogenic bacteria in plants and seeds.
Preferably, R1 is:
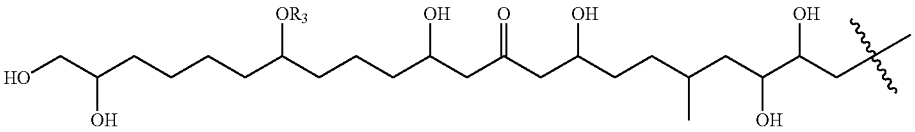
wherein $R_3$ is H or $SO_3Na$.

Preferably, $R_2$ is:

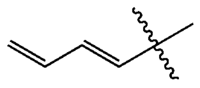 [SMILES: */C=C/C=C]

Preferably, the molecule of formula (I) is amphidinol 18 or amphidinol 19:

Amphidinol 18

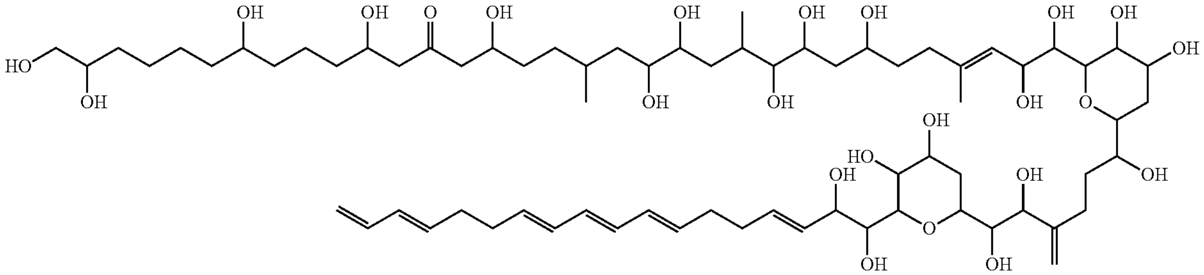

Amphidinol 19

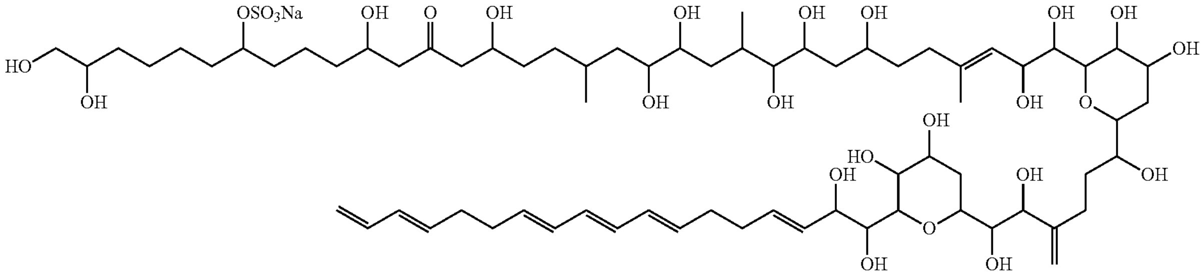

The molecule of formula (I) is an amphidinol.

The molecule of formula (I) can be synthetic or extracted from cells of one or more microalgae of the genus *Amphidinium.*

*Amphidinium* Species

Suitable *Amphidinium* species are selected from the group consisting of *Amphidinium achromaticum, Amphidinium aculeatum, Amphidinium acutissimum, Amphidinium acutum, Amphidinium alinii, Amphidinium aloxalocium, Amphidinium amphidinioides, Amphidinium asymmetricum, Amphidinium aureum, Amphidinium belauense, Amphidinium bidentatum, Amphidinium bipes, Amphidinium boekhoutensis, Amphidinium boggayum, Amphidinium caerulescens, Amphidinium carbunculus, Amphidinium carterae, Amphidinium celestinum, Amphidinium chattonii, Amphidinium coeruleum, Amphidinium conradii, Amphidinium conus, Amphidinium coprosum, Amphidinium corallinum, Amphidinium corpulentum, Amphidinium crassum, Amphidinium cristatum, Amphidinium cucurbita, Amphidinium cucurbitella, Amphidinium cupulatisquama, Amphidinium curvatum, Amphidinium cyaneoturbo, Amphidinium dentatum, Amphidinium discoidale, Amphidinium dubium, Amphidinium eilatiensis, Amphidinium emarginatum, Amphidinium fastigium, Amphidinium filum* Böhm, *Amphidinium flagellans, Amphidinium flexum, Amphidinium galbanum, Amphidinium gibbosum, Amphidinium glaucovirescens, Amphidinium glaucum, Amphidinium globosum, Amphidinium hadai, Amphidinium herdmanii, Amphidinium incoloratum, Amphidinium inflatum, Amphidinium kesselitzii, Amphidinium kesslitzii, Amphidinium klebsii, Amphidinium lacunarum, Amphidinium lanceolatum, Amphidinium lefevrei, Amphidinium lilloense, Amphidinium lissae, Amphidinium longum, Amphidinium luteum, Amphidinium machapungarum, Amphidinium macrocephalum, Amphidinium mammillatum, Amphidinium manannini, Amphidinium mananninii, Amphidinium massartii, Amphidinium mootonorum, Amphidinium mucicola, Amphidinium nasutum, Amphidinium obliquum, Amphidinium obrae, Amphidinium oceanicum, Amphidinium ocl/atum, Amphidinium operculatum, Amphidinium operculatum* var. *steinii, Amphidinium ornithocephalum, Amphidinium ovoideum, Amphidinium ovum, Amphidinium pacificum, Amphidinium pelagicum, Amphidinium phthartum, Amphidinium psammophila, Amphidinium psittacus, Amphidinium purpureum, Amphidinium pusillum, Amphidinium rhynchocephalum, Amphidinium roseolum, Amphidinium ruttneri, Amphidinium salinum, Amphidinium schilleri, Amphidinium schroederi, Amphidinium scissum, Amphidinium sphagnicola, Amphidinium sphenoides, Amphidinium steinii, Amphidinium stellatum, Amphidinium stigmatum, Amphidinium sulcatum, Amphidinium tortum, Amphidinium trochodinioides, Amphidinium trochodinoides, Amphidinium trulla, Amphidinium truncatum, Amphidinium turbo, Amphidinium vernal, Amphidinium vigrense, Amphidinium vitreum, Amphidinium vittatum, Amphidinium wigrense, Amphidinium yoorugurrum, Amphidinium yuroogurrum.*

Preferably, the molecule of formula (I) is extracted from *Amphidinium carterae.* There are several *Amphidinium carterae* strains in collection such as strains CCMP 124, 1314, 3177 (CCMP=Culture Collection of Marine Phytoplankton), AC 208, 792 (AC=Algobank Cean), BEA 01198 (BEA=Banco Espanol de Algas).

Advantageously, the *Amphidinium carterae* strain used according to the invention is CCMP 1314, AC208 or AC792.

Extraction

Said extract may be prepared by any cell extraction method known to the skilled person, solid-liquid or liquid-liquid, for example extraction in inorganic or organic solvent, which may be selected from the group consisting of water, aqueous solutions, hydrocarbon solvents (aliphatics, aromatics), oxygenated solvents (alcohols, ketones, acids, esters and ethers), halogenated solvents (dichloromethane, cholorforme) and mixtures in any miscible proportion thereof.

Advantageously, the preferred solvent will be water or oxygenated solvents, preferably alcohols, particularly preferably C1 to C4 alcohols such as methanol or ethanol.

Particularly preferably, C1 to C4 alcohols are preferred.

Preferably, said extract is a water-soluble fraction.

Concentration

Preferably, the molecule of formula (I) is used in an amount between 0.1 and 5 mg/mL, preferably between 0.5 and 3 mg/mL, particularly preferably between 0.75 and 1 mg/mL.

Mode of Action

Said fungicidal activity on crop plant and seed pathogenic fungi and/or oomycetes may be particularly exerted by inhibiting spore germination or by inhibiting fungal and/or oomycete growth.

The activity is exerted by cell wall and membrane lytic activity resulting in cell lysis.

Crop Plants

Said crop plants are in particular selected from the group consisting of cereals such as wheat, maize, barley, rice, soya, fruits and vegetables such as potato, carrot, apple trees, peach trees, apricot trees, tomatoes, radishes, beans, grapevine and ornamental plants.

Said crop plants are in particular selected from the group consisting of the genera *Abelmoschus, Acacia, Achras, Agave, Agrostis, Aleurites, Allium, Anacardium, Ananas, Annona, Apium, Arachis, Areca, Armoracia, Arracacia, Artocarpus, Asparagus, Aspidosperma, Avena, Bertholletia, Beta, Boehmeria, Borassus, Brassica, Cajanus, Camellia, Cannabis, Capsicum, Carica, Carthamus, Carum, Carya, Castanea, Ceiba, Ceratonia, Chenopodium, Chrysanthemum, Cicer, Cichorium, Cinchona, Cinnamomum, Citrullus, Citrus, Cocos, Coffea, Cola, Colocasia, Corchorus, Corylus, Crotalaria, Cucumis, Cucurbita, Cydonia, Cymbopogon, Cynara, Dactylis, Daucus, Dioscorea, Diospyros, Echinochloa, Elaeis, Elettaria, Eleusine, Eragrostis, Eriobotrya, Eugenia, Fagopyrum, Ficus, Foeniculum, Fragaria, Furcraea, Glycine, Glycyrrhiza, Gossypium, Guizotia, Helianthus, Hevea, Hibiscus, Hordeum, Humulus, Ilex, Indigofera, Ipomoea, Jasminum, Juglans, Lactuca, Lagenaria, Lavandula, Lawsonia, Lens, Lepidium, Lespedeza, Linum, Litchi, Lolium, Lopmoea, Lotus, Lupinus, Lycopersicon, Lygeum, Macadamia, Malus, Mangifera, Manihot, Maranta, Medicago, Mentha, Mespilus, Metroxylon, Moringa, Musa, Myristica, Nicotiana, Olea, Onobrychis, Oryza, Panicum, Papaver, Pastinaca, Pelargonium, Pennisetum, Persea, Phaseolus, Phleum, Phoenix, Phormium, Pimpinella, Piper, Pistacia, Pisum, Prunus, Psidium, Punica, Pyrus, Raphanus Rheum, Ribes, Ricinus, Rose, Rubus, Saccharum, Scorzonera, Secale Sechium, Sesamum, Setaria, Solanum, Sorghum, Spinacia, Theobroma, Tragopogon, Trifolium, Trigonella, Triticum, Urena, Vaccinium, Valerianella, Vanilla, Vicia, Vigna, Vitellaria, Vitis, Xanthosoma, Zea, Zingiber.*

Pathogens

Said crop plant and seed pathogenic fungi are ascomycetes or basidiomycetes, preferably ascomycetes.

Said crop plant and seed pathogenic fungi are fungi pathogenic to crop plants and seeds of the genera:

*Acrocalymma, Acrocalymma medicaginis,*

*Fusarium, Fusarium affine, Fusarium arthrosporioides, Fusarium crookwellense, Fusarium culmorum, Fusarium graminearum, Fusarium moniliforme, Fusarium incarnatum, Fusarium solani, Fusarium langsethiae, Fusarium mangiferae, Fusarium oxysporum* f. sp. *albedinis, Fusarium oxysporum* f. sp. *asparagi, Fusarium oxysporum* f. sp. *batatas, Fusarium oxysporum* f. sp. *betae, Fusarium oxysporum* f. sp. *cannabis, Fusarium oxysporum* f. sp. *carthami, Fusarium oxysporum* f. sp. *cattleyae, Fusarium oxysporum* f. sp. *ciceris, Fusarium oxysporum* f. sp. *coffea, Fusarium oxysporum* f. sp. *cubense, Fusarium oxysporum* f. sp. *cyclaminis, Fusarium oxysporum* f. sp. *dianthi, Fusarium oxysporum* f. sp. *lentis, Fusarium oxysporum* f. sp. *lini, Fusarium oxysporum* f. sp. *lycopersici, Fusarium oxysporum* f. sp. *medicaginis, Fusarium oxysporum* f. sp. *pisi, Fusarium oxysporum* f. sp. *radicis-lycopersici, Fusarium oxysporum* f. sp. *spinacia, Fusarium oxysporum, Fusarium pallidoroseum, Fusarium patch, Fusarium proliferatum, Fusarium redolens, Fusarium sacchari, Fusarium solani, Fusarium subglutinans, Fusarium sulphureum, Fusarium tricinctum, Fusarium wilt,*

*Botrytis, Botrytis allii, Botrytis anthophila, Botrytis cinerea, Botrytis fabae, Botrytis narcissicola,*

*Alternaria, Alternaria alternata, Alternaria brassicae, Alternaria brassicicola, Alternaria carthami, Alternaria cinerariae, Alternaria dauci, Alternaria dianthi, Alternaria dianthicola, Alternaria euphorbiicola, Alternaria helianthi, Alternaria helianthicola, Alternaria japonica, Alternaria leucanthemi, Alternaria limicola, Alternaria linicola, Alternaria padwickii, Alternaria panax, Alternaria radicina, Alternaria raphani, Alternaria saponariae, Alternaria senecionis, Alternaria solani, Alternaria tenuissima, Alternaria triticina, Alternaria zinniae,*

*Erisyphe, Erisyphe necator, Erysiphe betae, Erysiphe brunneopunctata, Erysiphe cichoracearum, Erysiphe cruciferarum, Erysiphe graminis* f. sp. *Avenae, Erysiphe graminis* f. sp. *tritici, Erysiphe heraclei, Erysiphe pisi,*

*Claviceps, Claviceps fusiformis, Claviceps purpurea, Claviceps sorghi, Claviceps zizaniae,*

*Gaeumannomyces, Gaeumannomyces graminis,*

*Leptosphaeria, Leptosphaeria nodorum, Leptosphaeria acuta, Leptosphaeria cannabina, Leptosphaeria coniothyrium, Leptosphaeria libanotis, Leptosphaeria lindquistii, Leptosphaeria maculans, Leptosphaeria musarum, Leptosphaeria pratensis, Leptosphaeria sacchari, Leptosphaeria woroninii,*

*Microdochium, Microdochium* spp. *Microdochium bolleyi, Microdochium dimerum, Microdochium panattonianum, Microdochium phragmitis,*

*Mycosphaerella, Mycosphaerella arachidis, Mycosphaerella areola, Mycosphaerella berkeleyi, Mycosphaerella bolleana, Mycosphaerella brassicicola, Mycosphaerella caricae, Mycosphaerella caryigena, Mycosphaerella cerasella, Mycosphaerella coffeicola, Mycosphaerella confusa, Mycosphaerella cruenta, Mycosphaerella dendroides, Mycosphaerella eumusae, Mycosphaerella gossypina, Mycosphaerella graminicola, Mycosphaerella henningsii, Mycosphaerella horii, Mycosphaerella juglandis, Mycosphaerella lageniformis, Mycosphaerella linicolo, Mycosphaerella louisianae, Mycosphaerella musae, Mycosphaerella musicola, Mycosphaerella palmicola, Mycosphaerella pinodes, Mycosphaerella pistaciarum, Mycosphaerella pistacina, Mycosphaerella platanifolia, Mycosphaerella polymorpha, Mycosphaerella pomi, Mycosphaerella punctiformis, Mycosphaerella pyri,*

*Oculimacula, Oculimacula acuformis, Oculimacula yallundae,*

*Blumeria, Blumeria graminis,*

*Pyrenophora, Pyrenophora avenae, Pyrenophora chaetomioides, Pyrenophora graminea, Pyrenophora seminiperda,*

*Pyrenophora teres, Pyrenophora teres* f. *maculata, Pyrenophora teres* f. *teres, Pyrenophora tritici-repentis,*

*Ramularia, Ramularia collo-cygni, Ramularia beticola, Ramularia coryli, Ramularia cyclaminicola, Ramularia macrospora, Ramularia menthicolo, Ramularia necator, Ramularia primulae, Ramularia spinaciae, Ramularia subtilis, Ramularia tenella, Ramularia vallisumbrosae,*

*Rhynchosporium, Rhynchosporium secalis,*

*Cochliobolus, Cochliobolus, Cochliobolus carbonum, Cochliobolus cymbopogonis, Cochliobolus hawaiiensis, Cochliobolus heterostrophus, Cochliobolus lunatus, Cochliobolus miyabeanus, Cochliobolus rovenelii, Cochliobolus sativus, Cochliobolus setariae, Cochliobolus spicifer, Cochliobolus stenospilus, Cochliobolus tuberculatus, Cochliobolus victoriae,*

*Microdochium, Microdochium oryzae,*

*Pyricularia, Pyricularia oryzae,*

*Sarocladium, Sarocladium oryzae,*

*Ustilaginoides, Ustilaginoides virens,*

*Cercospora, Cercospora, Cercospora apii, Cercospora apii* f. sp. *clerodendri, Cercospora apiicola, Cercospora arachidicola, Cercospora asparagi, Cercospora atrofiliformis, Cercospora beticola, Cercospora brachypus, Cercospora brassicicola, Cercospora brunkii, Cercospora cannabis, Cercospora cantuariensis, Cercospora capsici, Cercospora carotae, Cercospora corylina, Cercospora fuchsiae, Cercospora fusca, Cercospora fusimaculans, Cercospora gerberae, Cercospora halstedii, Cercospora handelii, Cercospora hayi, Cercospora hydrangeae, Cercospora kikuchii, Cercospora lentis, Cercospora liquidambaris, Cercospora longipes, Cercospora longissima, Cercospora mamaonis, Cercospora mangiferae, Cercospora medicaginis, Cercospora melongenae, Cercospora minuta, Cercospora nicotianae, Cercospora odontoglossi, Cercospora papayae, Cercospora penniseti, Cercospora pisa-sativae, Cercospora platanicola, Cercospora puderii, Cercospora pulcherrima, Cercospora rhapidicola, Cercospora rosicola, Cercospora sojina, Cercospora solani, Cercospora solani-tuberosi, Cercospora sorghi, Cercospora theae, Cercospora tuberculans, Cercospora vexans, Cercospora vicosae, Cercospora zeae-maydis, Cercospora zebrina, Cercospora zonata,*

*Corynespora, Corynespora cassiicola,*

*Phakospora, Phakospora pachyrhizi, Phakopsora gossypii, Colletotrichum, Colletotrichum acutatum, Colletotrichum arachidis, Colletotrichum capsici, Colletotrichum cereale, Colletotrichum coffeanum, Colletotrichum crassipes, Colletotrichum dematium, Colletotrichum dematium* f. *spinaciae, Colletotrichum derridis, Colletotrichum destructivum, Colletotrichum gloeosporioides, Colletotrichum glycines, Colletotrichum gossypii, Colletotrichum graminicola, Colletotrichum higginsianum, Colletotrichum kahawae, Colletotrichum lindemuthianum, Colletotrichum lini, Colletotrichum mangenotii, Colletotrichum musae, Colletotrichum nigrum, Colletotrichum orbiculare, Colletotrichum pisi, Colletotrichum sublineolum, Colletotrichum trichellum, Colletotrichum trifolii, Colletotrichum truncatum,*

*Pythium* spp,

*Diplodia, Diplodia allocellula, Diplodia laelio-cattleyae, Diplodia manihoti, Diplodia paraphysaria, Diplodia seriata, Diplodia theae-sinensis,*

*Monilia, Monilinia azaleae, Monilinia fructicola, Monilinia fructigena, Monilinia laxa, Monilinia oxycocci,*

*Pezzicula, Pezzicula alba, Pezzicula malicorticis,*

*Zymoseptoria, Zymoseptoria tritici*

*Phytophthora, Phytophthora infestans*

*Guignardia, Guignardia bidwelli, Guignardia camelliae, Guignardia fulvida, Guignardia mangiferae, Guignardia musae, Guignardia philoprina,*

*Plasmopara, Plasmopara viticola,*

*Puccinia, Puccinia angustata, Puccinia arachidis, Puccinia aristidae, Puccinia asparagi, Puccinia cacabata, Puccinia campanulae, Puccinia carthami, Puccinia coronata, Puccinia dioicae, Puccinia erianthi, Puccinia extensicola, Puccinia helianthi, Puccinia hordei, Puccinia jaceae, Puccinia kuehnii, Puccinia malvacearum, Puccinia mariae-wilsoniae, Puccinia melanocephala, Puccinia menthae, Puccinia oxalidis, Puccinia pelargonii-zonalis, Puccinia pittieriana, Puccinia poarum, Puccinia purpurea, Puccinia recondita, Puccinia schedonnardii, Puccinia sessilis, Puccinia striiformis, Puccinia striiformis, Puccinia subnitens, Puccinia substriata, Puccinia verruca, Puccinia xanthii,*

*Rhizoctonia, Rhizoctonia solani, Rhizoctonia oryzae, Rhizoctonia cerealis, Rhizoctonia leguminicola, Rhizoctonia rubi,*

*Sclerotinia, Sclerotinia borealis, Sclerotinia bulborum, Sclerotinia minor, Sclerotinia ricini, Sclerotinia sclerotiorum, Sclerotinia spermophila, Sclerotinia trifoliorum,*

*Septoria, Septoria ampelina, Septoria azaleae, Septoria bataticola, Septoria campanulae, Septoria cannabis, Septoria cucurbitacearum, Septoria darrowii, Septoria dianthi, Septoria eumusae, Septoria glycines, Septoria helianthi, Septoria humuli, Septoria hydrangeae, Septoria lactucae, Septoria lycopersici, Septoria lycopersici, Septoria menthae, Septoria passerinii, Septoria pisi, Septoria rhododendri, Septoria secalis, Septoria selenophomoides,*

*Venturia, Venturia inaequalis. Venturia carpophila,*

*Acrodontium, Acrodontium simplex,*

*Acrophialophora, Acrophialophora fusispora,*

*Acrosporium, Acrosporium tingitaninum,*

*Aecidium, Aecidium aechmantherae, Aecidium amaryllidis, Aecidium breyniae, Aecidium campanulastri, Aecidium cannabis, Aecidium cantensis, Aecidium caspicum, Aecidium foeniculi, Aecidium narcissi,*

Ahmadiago,

*Albonectria, Albonectria rigidiuscula,*

*Allodus, Allodus podophylli,*

*Amphobotrys, Amphobotrys ricini,*

*Anguillosporella, Anguillosporella vermiformis,*

*Anthostomella, Anthostomella pullulans,*

*Antrodia, Antrodia albida, Antrodia serialiformis, Antrodia serialis,*

*Apiospora, Apiospora montagnei,*

*Appendiculella,*

*Armillaria Armillaria heimii, Armillaria sinapina, Armillaria socialis, Armillaria tabescens,*

*Arthrocladiella,*

*Arthuriomyces, Arthuriomyces peckianus,*

*Ascochyta, Ascochyta asparagina, Ascochyta bohemica, Ascochyta caricae, Ascochyta doronici, Ascochyta fabae* f. sp. *lentis, Ascochyta graminea, Ascochyta hordei, Ascochyta humuli, Ascochyta pisi, Ascochyta prasadii, Ascochyta sorghi, Ascochyta spinaciae, Ascochyta tarda, Ascochyta tritici,*

*Ascospora, Ascospora ruborum,*

*Aspergillus, Aspergillus aculeatus, Aspergillus fischerianus, Aspergillus niger,*

*Asperisporium, Asperisporium caricae,*

*Asteridiella,*

*Asteroma, Asteroma caryae,*

*Athelia, Athelia arachnoidea, Athelia rolfsii,*

*Aura ntiporus, Aurantiporus fissilis,*

*Aureobasidium, Aureobasidium pullulans,*

*Bambusiomyces,*

Banana freckle,

Bayoud disease,

*Beniowskia, Beniowskia sphaeroidea,*

*Bionectria, Bionectria ochroleuca,*

*Bipolaris, Bipolaris cactivora, Bipolaris cookei, Bipolaris incurvata, Bipolaris sacchari,*

*Biscogniauxia, Biscogniauxia capnodes, Biscogniauxia marginata,*

*Bjerkandera, Bjerkandera adusta,*

Black sigatoka,

*Blakeslea, Blakeslea trispora,*

*Botryodiplodia, Botryodiplodia oncidii, Botryodiplodia ulmicola,*

*Botryosphaeria, Botryosphaeria cocogena, Botryosphaeria dothidea, Botryosphaeria marconii, Botryosphaeria obtusa, Botryosphaeria rhodina, Botryosphaeria ribis, Botryosphaeria stevensii,*

*Botryosporium, Botryosporium pulchrum,*

*Botryotinia, Botryotinia fuckeliana, Botryotinia polyblastis,*

Boxwood blight,

Brachybasidiaceae,

*Brasiliomyces, Brasiliomyces malachrae,*

*Briosia, Briosia ampelophaga,*

Brown ring patch,

Buckeye rot of tomato,

*Bulbomicrosphaera,*

*Cadophora, Cadophora malorum,*

*Caespitotheca,*

*Calonectria, Calonectria ilicicola, Calonectria indusiata, Calonectria kyotensis, Calonectria pyrochroa, Calonectria quinqueseptata,*

*Camarotella, Camarotella acrocomiae, Camarotella costaricensis,*

*Canna* rust,

*Capitorostrum, Capitorostrum cocoes,*

*Capnodium, Capnodium footii, Capnodium mangiferum, Capnodium ramosum, Capnodium theae,*

*Cephalosporium, Cephalosporium gramineum,*

*Ceratobasidium, Ceratobasidium cereale, Ceratobasidium cornigerum, Ceratobasidium noxium, Ceratobasidium ramicola, Ceratobasidium setariae, Ceratobasidium stevensii,*

*Ceratocystis, Ceratocystis adiposa, Ceratocystis coerulescens, Ceratocystis fimbriata, Ceratocystis moniliformis, Ceratocystis oblonga, Ceratocystis obpyriformis, Ceratocystis paradoxa, Ceratocystis pilifera, Ceratocystis pluriannulata, Ceratocystis polyconidia, Ceratocystis tanganyicensis, Ceratocystis zombamontana,*

*Ceratorhiza, Ceratorhiza hydrophila,*

*Ceratospermopsis,*

*Cercoseptoria, Cercoseptoria ocellata,*

*Cercosporella, Cercosporella rubi,*

*Ceriporia, Ceriporia spissa, Ceriporia xylostromatoides,*

*Cerrena, Cerrena unicolor,*

*Ceuthospora, Ceuthospora lauri,*

*Choanephora, Choanephora cucurbitarum, Choanephora infundibulifera,*

*Chrysanthemum, Chrysanthemum* white rust,

*Chrysomyxa, Chrysomyxa cassandrae,*

*Chrysomyxa, Chrysomyxa himalensis, Chrysomyxa ledi, Chrysomyxa ledi* var. *rhododendri, Chrysomyxa ledicola, Chrysomyxa nagodhii, Chrysomyxa neoglandulosi, Chrysomyxa piperiana, Chrysomyxa pirolata, Chrysomyxa pyrolae, Chrysomyxa reticulata, Chrysomyxa roanensis, Chrysomyxa succinea,*

*Cladosporium, Cladosporium arthropodii, Cladosporium cladosporioides, Cladosporium cladosporioides* f. sp. *pisicola, Cladosporium cucumerinum, Cladosporium herbarum, Cladosporium musae, Cladosporium oncobae,*

*Climacodon, Climacodon pulcherrimus, Climacodon septentrionalis,*

*Clitocybe, Clitocybe parasitica,*

*Clonostachys rosea* f. *rosea,*

*Clypeoporthe, Clypeoporthe iliau,*

*Coleosporium, Coleosporium helianthi, Coleosporium ipomoeae, Coleosporium madiae, Coleosporium pacificum, Coleosporium tussilaginis,*

*Conidiosporomyces,*

*Coniella, Coniella castaneicola, Coniella diplodiella, Coniella fragariae,*

*Coniothecium, Coniothecium chomatosporum,*

*Coniothyrium, Coniothyrium celtidis-australis, Coniothyrium henriquesii, Coniothyrium rosarum, Coniothyrium wernsdorffiae,*

*Coprinopsis, Coprinopsis psychromorbida,*

*Cordana, Cordana johnstonii, Cordana musae, Coriolopsis floccosa,*

Corn grey leaf spot,

*Corticium, Corticium invisum, Corticium penicillatum, Corticium theae,*

*Coryneopsis, Coryneopsis rubi,*

*Coryneum, Coryneum rhododendri,*

Covered smut,

*Crinipellis, Crinipellis sarmentosa,*

*Cronartium, Cronartium ribicola,*

Cryphonectriaceae,

Cryptobasidiaceae,

*Cryptocline, Cryptocline cyclaminis,*

Cryptomeliola,

*Cryptosporella, Cryptosporella umbrina,*

*Cryptosporiopsis, Cryptosporiopsis tarraconensis,*

*Cryptosporium, Cryptosporium minimum,*

*Curvularia, Curvularia lunata, Curvularia caricae-papayae, Curvularia penniseti, Curvularia senegalensis, Curvularia trifolii,*

*Cyclaneusma* needle cast,

*Cylindrocarpon, Cylindrocarpon ianthothele* var. *ianthothele, Cylindrocarpon magnusianum, Cylindrocarpon muscae,*

*Cylindrocladiella, Cylindrocladiella camelliae, Cylindrocladiella parva,*

*Cylindrocladium, Cylindrocladium clavatum, Cylindrocladium lanceolatum, Cylindrocladium peruvianum, Cylindrocladium pteridis,*

*Cylindrosporium, Cylindrosporium cannabinum, Cylindrosporium juglandis, Cylindrosporium rubi,*

*Cymadothea, Cymadothea trifolii,*

*Cytospora, Cytospora palmarum, Cytospora personata, Cytospora sacchari, Cytospora sacculus, Cytospora terebinthi,*

*Cytosporina, Cytosporina ludibunda,*

*Dactuliophora, Dactuliophora elongata,*

*Davidiella, Davidiella dianthi, Davidiella tassiana,*

*Deightoniella, Deightoniella papuana, Deightoniella torulosa,*

*Dendrophora, Dendrophora marconii, Dendrophora erumpens, Denticularia, Denticularia mangiferae,*

*Dermea pseudotsugae,*

Diaporthaceae,

*Diaporthe, Diaporthe arctii, Diaporthe dulcamarae, Diaporthe eres, Diaporthe helianthi, Diaporthe lagunensis, Diaporthe lokoyae, Diaporthe melonis, Diaporthe* orthoceras, Diaporthe perniciosa, Diaporthe phaseolorum, Diaporthe phaseolorum var. caulivora, Diaporthe phaseolorum var. phaseolorum, Diaporthe phaseolorum var. sofa, Diaporthe rudis, Diaporthe tanakae, Diaporthe toxica, Dicarpella, Dicarpella dryina, Didymella, Didymella applanata, Didymella bryoniae, Didymella fabae, Didymella lycopersici Didymosphaeria, Didymosphaeria arachidicola, Didymosphaeria taiwanensis, Dilophospora, Dilophospora alopecuri, Dimeriella, Dimeriella sacchari, Diplocarpon, Diplocarpon mespili, Diplocarpon rosae, Discosia, Discosia artocreas, Discostroma, Discostroma corticola, Distocercospora, Distocercospora livistonae, Dothiorella, Dothiorella brevicollis, Dothiorella dominicana, Dothiorella dulcispinae, Dothiorella gregaria, Drechslera, Drechslera avenacea, Drechslera companulata, Drechslera dematioidea, Drechslera gigantea, Drechslera glycines, Drechslera musae-sapientium, Drechslera teres f. maculata, Drechslera wirreganensis, Eballistra, Eballistra lineata, Eballistra oryzae, Eballistraceae, Echinodontium, Echinodontium ryvardenii, Echinodontium tinctorium, Ectendomeliola, Elsinöe, Elsinöe ampelina, Elsinöe batatas, Elsinöe brasiliensis, Elsinöe leucospila, Elsinöe randii, Elsinöe rosarum, Elsinöe sacchari, Elsinöe theae, Elsinöe veneta, Endomeliola, Endothia, Endothia radicalis, Endothiella, Endothiella gyrosa, Entorrhizomycetes, Entyloma, Entyloma ageratinae, Entyloma dahliae, Entyloma ellisii, Epicoccum, Epicoccum nigrum, Eremothecium, Eremothecium coryli, Eremothecium gossypii, Erysiphales, Exobasidiaceae, Exobasidium burtii, Exobasidium reticulatum, Exobasidium vaccinii var. japonicum, Exobasidium vaccinii-uliginosi, Exobasidium vexans, xxophiala alcalophila, Exophiala, Exophiala angulospora, Exophiala attenuata, Exophiala calicioides, Exophiala castellanii, Exophiala dermatitidis, Exophiala dopicola, Exophiala exophialae, Exophiala heteromorpha, Exophiala hongkongensis, Exophiala jeanselmei, Exophiala lecanii-corni, Exophiala mansonii, Exophiala mesophila, Exophiala moniliae, Exophiala negronii, Exophiala phaeomuriformis, Exophiala pisciphila, Exophiala psychrophila, Exophiala salmonis, Exophiala spinifera, Fomes, Fomes lamaensis, Fomitopsis, Fomitopsis rosea, Fusicladium Fusicladium pisicola, Fusicoccum, Fusicoccum aesculi, Fusicoccum amygdali, Fusicoccum quercus, Galactomyces, Galactomyces candidum, Ganoderma, Ganoderma brownii, Ganoderma lobatum, Ganoderma megaloma, Ganoderma meredithiae, Ganoderma orbiforme, Ganoderma philippii, Ganoderma sessile, Ganoderma tornatum, Ganoderma zonatum, Geastrumia, Geastrumia polystigmatis, Georgefischeriaceae, Georgefischeriales, Geosmithia, Geosmithia pallida, Geotrichum, Geotrichum candidum, Geotrichum klebahnii, Gibberella, Gibberella acuminata, Gibberella avenacea, Gibberella baccata, Gibberella cyanogena, Gibberella fujikuroi, Gibberella intricans, Gibberella pulicaris, Gibberella stilboides, Gibberella tricincta, Gibberella xylarioides, Gibberella zeae, Gibellina, Gibellino cerealis, Gilbertella, Gilbertella persicaria, Gjaerumiaceae, Gliocladiopsis, Gliocladiopsis tenuis, Gliocladium, Gliocladium vermoeseni, Gloeocercospora, Gloeocercospora sorghi, Gloeocystidiellum, Gloeocystidiellum porosum, Gloeophyllum, Gloeophyllum mexicanum, Gloeophyllum trabeum, Gloeoporus, Gloeoporus dichrous, Gloeosporium, Gloeosporium cattleyae, Gloeosporium theae-sinensis, Glomerella, Glomerella cingulata, Glomerella graminicola, Glomerella tucumanensis, Gnomonia, Gnomonic caryae, Gnomonic comari, Gnomonic dispora, Gnomonic iliau, Gnomonia rubi, Golovinomyces, Golovinomyces cichoracearum, Graphiola phoenicis, Graphiolaceae, Graphium, Graphium rigidum, Graphium rubrum, Graphyllium, Graphyllium pentamerum, Grovesinia, Grovesinia pyramidalis, Gymnoconia, Gymnoconia nitens, Gymnopus, Gymnopus dryophilus, Gymnosporangium, Gymnosporangium kernianum, Gymnosporangium libocedri, Gymnosporangium nelsonii, Gymnosporangium yamadae, Haematonectria, Haematonectria haematococca, Hansenula, Hansenula subpelliculosa, Hapalosphaeria, Hapalosphaeria deformans, Haplobasidion, Haplobasidion muscae, Helicobasidium, Helicobasidium compactum, Helicobasidium longisporum, Helicobasidium purpureum, Helicoma, Helicoma muelleri, Helminthosporium, Helminthosporium cookei, Helminthosporium solani, Hendersonia, Hendersonia creberrima, Hendersonia theicola, Hericium, Hericium coralloides, Heterobasidion, Heterobasidion irregulare, Heterobasidion occidentale, Hexagonia, Hexagonia hydnoides, Hymenula, Hymenula affinis, Hyphodermella, Hyphodermella corrugata, Hyphodontia, Hyphodontia aspera, Hyphodontia sambuci, Hypoxylon, Hypoxylon tinctor, Inonotus, Inonotus arizonicus, Inonotus cuticularis, Inonotus dryophilus, Inonotus hispidus, Inonotus ludovicianus, Irpex, Irpex destruens, Irpex acteus, Kabatiella, Kabatiella caulivora, Karnal bunt, Koa wilt, Kretzschmaria, Kretzschmaria zonata, Kuehneola, Kuehneola uredinis, Kutilakesa, Kutilakesa pironii, Laetiporus, Laetiporus ailaoshanensis, Laetiporus baudonii, Laetiporus caribensis, Laetiporus conifericola,

*Laetiporus cremeiporus, Laetiporus gilbertsonii, Laetiporus huroniensis, Laetiporus montanus, Laetiporus portentosus, Laetiporus zonatus,*

*Laxitextum, Laxitextum bicolor,*

*Leandria, Leandria momordicae,*

*Lentinus, Lentinus tigrinus,*

*Lenzites, Lenzites betulina, Lenzites elegans,*

*Leohumicola, Leohumicola atra, Leohumicola incrustata, Leohumicola levissima,*

*Leptodontidium, Leptodontidium elatius,*

*Leptographium, Leptographium microsporum,*

*Leptosphaerulina, Leptosphaerulina crassiasca, Leptosphaerulina trifolii,*

*Leptothyrium, Leptothyrium nervisedum,*

*Leptotrochila, Leptotrochila medicaginis,*

*Leucocytospora, Leucocytospora leucostoma,*

*Leucostoma, Leucostoma auerswaldii, Leucostoma canker, Leucostoma kunzei, Leucostoma persoonii,*

*Leveillula, Levellula compositarum, Levellula leguminosarum, Levellula taurica,*

*Limacinula, Limacinula tenuis,*

*Linochora, Linochora graminis,*

Loose smut,

*Lopharia, Lopharia crassa,*

*Lophodermium, Lophodermium aucupariae, Lophodermium schweinitzii,*

*Macrophoma, Macrophoma mangiferae, Macrophoma theicola,*

*Macrosporium, Macrosporium cocos,*

*Magnaporthe, Magnaporthe grisea, Magnaporthe salvinii,*

*Magnaporthiopsis,*

*Mamianiella, Mamianiella coryli,*

*Marasmiellus, Marasmiellus cocophilus, Marasmiellus stenophyllus,*

*Marasmius, Marasmius crinis-equi, Marasmius sacchari, Marasmius semiustus, Marasmius stenophyllus, Marasmius tenuissimus,*

*Massarina, Massarina walkeri,*

*Mauginiella, Mauginiella scaettae,*

*Melampsora, Melampsora lini, Melampsora occidentalis,*

*Melanconis, Melanconis carthusiana,*

*Melanconium, Melanconium juglandinum,*

*Meliola, Meliola mangiferae, Meliola zangii,*

*Meruliopsis, Meruliopsis ambigua,*

*Microascus, Microascus brevicaulis,*

*Microbotryum, Microbotryum silenes-dioicae, Microbotryum violaceum, Microsphaera, Microsphaera coryli, Microsphaera diffusa, Microsphaera ellisii, Microsphaera euphorbiae, Microsphaera hommae, Microsphaera penicillata, Microsphaera vaccinii, Microsphaera verruculosa,*

*Microstroma, Microstroma juglandis,*

*Moesziomyces, Moesziomyces bullatus,*

*Moniliophthora, Moniliophthora roreri,*

*Monilochaetes, Monilochaetes infuscans,*

*Monochaetia, Monochaetia coryli, Monochaetia mali,*

*Monographella, Monographella albescens, Monographella cucumerina, Monographella nivalis,*

*Monosporascus, Monosporascus cannonballus, Monosporascus eutypoides,*

*Monostichella, Monostichella coryli,*

*Mucor, Mucor circinelloides, Mucor hiemalis, Mucor mucedo, Mucor paronychius, Mucor piriformis, Mucor racemosus,*

*Mycena, Mycena citricolor,*

*Mycocentrospora, Mycocentrospora acerina,*

*Mycoleptodiscus, Mycoleptodiscus terrestris,*

*Didymella, Didymella rabiei,*

*Mycosphaerella, Mycosphaerella recutita, Mycosphaerella rosicola, Mycosphaerella rubi, Mycosphaerella stigmina-platani, Mycosphaerella striatiformans,*

*Mycovellosiella, Mycovellosiella concors,*

*Passalora, Passalora fulva,*

*Mycovellosiella, Mycovellosiella koepkei, Mycovellosiella vaginae,*

*Myriogenospora, Myriogenospora aciculispora,*

*Myrothecium, Myrothecium roridum, Myrothecium verrucaria,*

*Naevala, Naevala perexigua,*

*Naohidemyces, Naohidemyces vaccinii,*

*Nectria, Nectria cinnabarina, Nectria ditissima, Nectria foliicola, Nectria mammoidea, Nectria mauritiicola, Nectria peziza, Nectria pseudotrichia, Nectria radicicola, Nectria ramulariae,*

*Nectriella, Nectriella pironii,*

*Nemania, Nemania diffusa, Nemania serpens,*

*Neocosmospora, Neocosmospora vasinfecta,*

*Neodeightonia, Neodeightonia phoenicum,*

*Neoerysiphe, Neoerysiphe galeopsidis,*

*Neofabraea, Neofabraea perennans,*

*Neofusicoccum, Neofusicoccum mangiferae,*

*Oidiopsis, Oidiopsis gossypii,*

*Oidium, Oidium arachidis, Oidium caricae-papayae, Oidium indicum, Oidium mangiferae, Oidium manihotis,*

*Olpidium, Olpidium brassicae,*

*Omphalia, Omphalia tralucida,*

*Ophiobolus, Ophiobolus anguillides, Ophiobolus cannabinus,*

*Ophioirenina,*

*Ovulinia, Ovulinia azaleae,*

*Oxyporus, Oxyporus corticola,*

*Ozonium, Ozonium texanum,*

*Peltaster, Peltaster fructicola,*

*Penicillium, Penicillium expansum, Penicillium funiculosum,*

*Peniophora,*

*Periconia, Periconia circinata,*

*Periconiella, Periconiella cocoes,*

*Peridermium, Peridermium californicum,*

*Pestalosphaeria, Pestalosphaeria concentrica,*

*Pestalotia, Pestalotia longiseta, Pestalotia rhododendri,*

*Pestalotiopsis, Pestalotiopsis adusta, Pestalotiopsis arachidis, Pestalotiopsis disseminata, Pestalotiopsis guepini, Pestalotiopsis leprogena, Pestalotiopsis longiseta, Pestalotiopsis mangiferae, Pestalotiopsis palmarum, Pestalotiopsis sydowiana, Pestalotiopsis theae,*

*Peyronellaea, Peyronellaea curtisii,*

*Phacidiopycnis, Phacidiopycnis padwickii,*

*Phaeochoropsis, Phaeochoropsis mucosa,*

*Phaeocytostroma, Phaeocytostroma iliau, Phaeocytostroma sacchari,*

*Phaeoisariopsis, Phaeoisariopsis bataticola,*

*Phaeoramularia, Phaeoramularia heterospora, Phaeoramularia indica, Phaeoramularia manihotis,*

*Phaeoseptoria, Phaeoseptoria musae,*

*Phaeosphaerella, Phaeosphaerella mangiferae, Phaeosphaerella theae,*

*Phaeosphaeria, Phaeosphaeria avenaria, Phaeosphaeria herpotrichoides, Phaeosphaeria microscopica, Phaeosphaeria nodorum,*

*Phaeosphaeriopsis, Phaeosphaeriopsis obtusispora,*

*Phaeotrichoconis, Phaeotrichoconis crotalariae,*

*Phialophora, Phialophora asteris, Phialophora cinerescens, Phialophora gregata, Phialophora tracheiphila,*

*Phoma, Phoma clematidina, Phoma costaricensis, Phoma cucurbitacearum, Phoma destructiva, Phoma draconis, Phoma exigua, Phoma exigua, Phoma exigua* var. *foveata, Phoma exigua, Phoma glomerata, Phoma glycinicola, Phoma herbarum, Phoma insidiosa, Phoma medicaginis, Phoma microspora, Phoma narcissi, Phoma nebulosa, Phoma oncidii-sphacelati, Phoma pinodella, Phoma sclerotioides, Phoma strasseri,*

*Phomopsis, Phomopsis asparagi, Phomopsis asparagicola, Phomopsis cannabina, Phomopsis coffeae, Phomopsis ganjae, Phomopsis javanica, Phomopsis longicolla, Phomopsis mangiferae, Phomopsis prunorum, Phomopsis sclerotioides, Phomopsis theae,*

*Phragmidium, Phragmidium mucronatum, Phragmidium rosae-pimpinellifoliae, Phragmidium rubi-idaei, Phragmidium violaceum,*

*Phyllachora, Phyllachora banksiae, Phyllachora cannabis, Phyllachora graminis, Phyllachora gratissima, Phyllachora musicola, Phyllachora pomigena, Phyllachora sacchari,*

*Phyllactinia,*

*Phyllosticta, Phyllosticta alliariaefoliae Phyllosticta arachidis-hypogaeae, Phyllosticta batatas, Phyllosticta capitalensis, Phyllosticta carpogena, Phyllosticta coffeicola, Phyllosticta concentrica, Phyllosticta coryli, Phyllosticta cucurbitacearum, Phyllosticta cyclaminella, Phyllosticta erratica, Phyllosticta hawaiiensis, Phyllosticta lentisci, Phyllosticta manihotis, Phyllosticta micropuncta, Phyllosticta mortonii, Phyllosticta nicotianae, Phyllosticta palmetto, Phyllosticta penicillariae, Phyllosticta perseae, Phyllosticta pseudocapsici, Phyllosticta sojaecola, Phyllosticta theae, Phyllosticta theicola,*

*Phymatotrichopsis, Phymatotrichopsis omnivora,*

*Physalospora, Physalospora disrupta, Physalospora perseae,*

*Physoderma, Physoderma alfalfae, Physoderma leproides, Physoderma trifolii,*

*Physopella, Physopella ampelopsidis,*

*Pileolaria, Pileolaria terebinthi,*

*Piricaudiopsis, Piricaudiopsis punicae, Piricaudiopsis rhaphidophorae, Piricaudiopsis rosae,*

*Plenodomus, Plenodomus destruens, Plenodomus meliloti,*

*Pleosphaerulina, Pleosphaerulina sojicola,*

*Pleospora, Pleospora alfalfae, Pleospora betae, Pleospora herbarum, Pleospora lycopersici, Pleospora tarda, Pleospora theae,*

*Pleuroceras,*

*Podosphaera, Podosphaera fuliginea, Podosphaera fusca, Podosphaera leucotricha, Podosphaera macularis, Podosphaera pannosa,*

*Polyscytalum, Polyscytalum pustulans,*

*Poria, Poria hypobrunnea,*

*Postia, Postia tephroleuca,*

Powdery mildew,

*Pseudocercospora, Pseudocercospora arecacearum, Pseudocercospora cannabina, Pseudocercospora fuligena, Pseudocercosporella herpotrichoides, Pseudocercospora gunnerae, Pseudocercospora pandoreae, Pseudocercospora puderi, Pseudocercospora rhapisicola, Pseudocercospora theae, Pseudocercospora vitis, Pseudocercosporella capsellae,*

*Pseudocochliobolus, Pseudocochliobolus eragrostidis,*

*Pseudoepicoccum, Pseudoepicoccum cocos,*

*Pseudopeziza, Pseudopeziza jonesii, Pseudopeziza medicaginis, Pseudopeziza trifolii,*

*Pseudoseptoria, Pseudoseptoria donacis,*

Pucciniaceae,

*Pucciniastrum, Pucciniastrum americanum, Pucciniastrum arcticum, Pucciniastrum epilobii, Pucciniastrum hydrangeae,*

*Pycnostysanus, Pycnostysanus azaleae,*

*Pyrenochaeta, Pyrenochaeta lycopersici, Pyrenochaeta terrestris,*

*Pyrenopeziza, Pyrenopeziza brassicae,*

*Ramichloridium, Ramichloridium musae,*

*Ramulispora, Ramulispora sorghi, Ramulispora sorghicola,*

*Rhinocladium, Rhinocladium corticola,*

*Rhizophydium, Rhizophydium graminis,*

*Rhizopus, Rhizopus arrhizus, Rhizopus circinans, Rhizopus microsporus, Rhizopus oryzae,*

*Rhytisma, Rhytisma punctatum, Rhytisma vitis,*

*Rigidoporus, Rigidoporus vinctus,*

*Rosellinia, Rosellinia arcuata, Rosellinia bunodes, Rosellinia necatrix, Rosellinia pepo,*

*Saccharicola, Saccharicola taiwanensis,*

*Schiffnerula, Schiffnerula cannabis,*

*Schizophyllum, Schizophyllum commune,*

*Schizopora, Schizopora flavipora,*

*Schizothyrium, Schizothyrium pomi,*

*Sclerophthora, Sclerophthora macrospora,*

*Sclerotium, Sclerotium cinnamomi, Sclerotium delphinii,*

*Scytinostroma, Scytinostroma galactinum,*

*Seimatosporium, Seimatosporium mariae, Seimatosporium rhododendri,*

*Selenophoma, Selenophoma linicola,*

*Septobasidium, Septobasidium bogoriense, Septobasidium euryae-groffii, Septobasidium gaoligongense, Septobasidium pilosum, Septobasidium polygoni, Septobasidium pseudopedicellatum, Septobasidium theae,*

*Septocyta, Septocyta ruborum,*

*Serpula, Serpula lacrymans,*

*Setosphaeria, Setosphaeria rostrata, Setosphaeria turcica,*

*Spencermartinsia, Spencermartinsia pretoriensis,*

*Sphaceloma, Sphaceloma arachidis, Sphaceloma menthae, Sphaceloma perseae, Sphaceloma poinsettiae, Sphaceloma sacchari, Sphaceloma theae,*

*Sphacelotheca, Sphacelotheca reiliana, Sphaerotheca castagnei,*

*Sphaerulina, Sphaerulina oryzina, Sphaerulina rehmiana, Sphaerulina rubi,*

*Sphenospora, Sphenospora kevorkianii,*

*Spilocaea, Spilocaea oleaginea,*

*Sporisorium, Sporisorium cruentum, Sporisorium ehrenbergii, Sporisorium scitamineum, Sporisorium sorghi,*

*Sporonema, Sporonema phacidioides,*

*Stagonospora, Stagonospora avenae, Stagonospora meliloti, Stagonospora recedens, Stagonospora sacchari, Stagonospora tainanensis,*

*Stagonosporopsis,*

*Stegocintractia, Stegocintractia junci,*

*Stemphylium, Stemphylium alfalfae, Stemphylium bolickii, Stemphylium cannabinum, Stemphylium globuliferum, Stemphylium lycopersici, Stemphylium sarciniforme, Stemphylium solani, Stemphylium vesicarium,*

*Stenella, Stenella anthuriicola,*

*Stigmatomycosis,*

*Stigmina, Stigmina carpophila, Stigmina palmiyora, Stigmina platani-racemosae,*

*Stromatinia, Stromatinia cepivora,*

*Sydowiella, Sydowiella depressula,*

Sydowiellaceae,

*Synchytrium, Synchytrium endobioticum,*
*Tapesia, Tapesia acuformis, Tapesia yallundae,*
*Taphrina, Taphrina coryli, Taphrina potentillae,*
*Thanatephorus, Thanatephorus cucumeris,*
*Thecaphora, Thecaphora solani,*
*Thielaviopsis, Thielaviopsis basicola, Thielaviopsis ceramica,*
*Thyrostroma, Thyrostroma compactum,*
*Tiarosporella, Tiarosporella urbis-rosarum,*
*Tilletia, Tilletia barclayana, Tilletia caries, Tilletia controversa, Tilletia laevis, Tilletia tritici, Tilletia walkeri,*
Tilletiariaceae,
Togniniaceae,
*Tranzschelia, Tranzschelia pruni-spinosae,*
*Trichoderma, Trichoderma koningii, Trichoderma paucisporum, Trichoderma songyi, Trichoderma theobromicola, Trichoderma viride,*
*Tubercularia, Tubercularia lateritia,*
*Tunstallia, Tunstallia aculeata,*
*Typhula, Typhula blight, Typhula idahoensis, Typhula incarnata, Typhula ishikariensis, Typhula variabilis,*
*Ulocladium, Ulocladium consortiale,*
*Uncinula,*
*Uredo, Uredo behnickiana, Uredo kriegeriana, Uredo musae, Uredo nigropuncta, Uredo rangelii,*
*Urocystis, Urocystis agropyri, Urocystis brassicae, Urocystis occulta,*
*Uromyces, Uromyces apiosporus, Uromyces appendiculatus, Uromyces beticola,*
*Uromyces ciceris-arietini, Uromyces dianthi, Uromyces euphorbiae, Uromyces graminis, Uromyces inconspicuus, Uromyces lineolatus, Uromyces musae, Uromyces oblongus, Uromyces pisi-sativi, Uromyces pröeminens, Uromyces medicaginis, Uromyces trifolii-repentis, Uromyces viciae-fabae,*
*Urophlyctis, Urophlyctis leproides, Urophlyctis trifolii,*
*Ustilaginales,*
*Ustilago, Ustilago avenae, Ustilago esculenta, Ustilago hordei, Ustilago maydis, Ustilago nigra, Ustilago nuda, Ustilago scitaminea, Ustilago tritici,*
*Vankya, Vankya ornithogali,*
Velvet blight,
*Veronaea, Veronaea musae,*
*Verticillium, Verticillium albo-atrum, Verticillium alfalfae, Verticillium dahliae, Verticillium isaacii, Verticillium klebahnii, Verticillium longisporum, Verticillium nonalfalfae, Verticillium theobromae, Verticillium wilt, Verticillium zaregamsianum,*
*Waitea, Waitea circinata,*
*Westea,*
Wheat leaf rust,
Wheat mildew,
*Wuestneiopsis, Wuestneiopsis georgiana,*
*Xeromphalina, Xeromphalina fraxinophila,*
*Zopfia, Zopfia rhizophila,*
*Zygosaccharomyces, Zygosaccharomyces bailii, Zygosaccharomyces florentinus,*
*Zythiostroma.*

Preferably, the pairs of fungi, oomycetes or bacteria vs. crop plants covered by the invention are the following:

Wheat (*Triticum sativum*)

*Claviceps purpurea, Erysiphe graminis, Fusarium avenaceum, Fusarium culmorum, Fusarium graminearum, Fusarium langsethiae, Fusarium poae, Fusarium pseudograminearum, Gaeumannomyces graminis, Leptosphaeria nodorum, Microdochium* spp., *Mycosphaerella graminicola, Oculimacula acuformis, Oculimacula yallundae, Puccinia recöndita, Puccinia striiformis, Pyrenophora tritici-repentis, Rhizoctonia cerealis, Microdochium* and *Zymoseptoria tritici*

Maize (*Zea mays*)

*Fusarium graminearum, Fusarium proliferatum, Fusarium subglutinans, Fusarium verticillioides*

Barley (*Hordeum vulgare*)

*Blumeria graminis, Fusarium* spp., *Pyrenophora teres, Ramularia collo-cygni, Rhynchosporium secalis*

Rice (*Oryza sativa*)

*Cochliobolus miyabeanus, Fusarium fijikuroï, Magnaporthe oryzae, Microdochium oryzae, Pyricularia oryzae, Rhizoctonia oryzae, Rhizoctonia solani, Sarocladium oryzae, Ustilaginoides virens*

Potato (*Solanum tuberosum*)

*Alternia alternata, Alternaria solani, Phytophtora infestans, Rhizoctonia solani*

Grapevine (*Vinis vitifera*)

*Botrytis cinerea, Erysiphe necator, Plasmopara viticola, Guignardia bidwelli, Erisyphe necator, Dipodia seriata*

Soya (*Glycine max*)

*Cercopora kikuchii, Colletotrichum dematium, Corynespora cassiicola, Fusarium graminearum, Pythium* spp., *Rhizoctonia solani, Sclerotinia sclerotiorum, Septoria glycines*

Apple Tree (*Malus domestica*)

*Monilia fructigena, Monilia laxa, Pezzicula alba, Pezzicula malicorticis, Venturia inaequalis*

Tomato (*Lycopersicon esculentum*)

*Phytophtora infestans*

Bean (*Phaseolus vulgaris*)

*Uromyces appendiculatus*

Radish (*Raphanus sativus*)

*Alternaria brassicae*

All Fruits and Vegetables

*Botrytis cinerea*

Strawberry Plant (*Fragaria* sp.)

*Colletotrichum acutatum*

Carrot (*Daucus carota*)

*Aternaria alternata, Alternaria dauci, Alternaria radicina*

Peach (*Prunus persica*) and Apricot (*Prunus armeniaca*)

*Monilia fructicola, Monilia fructigena, Monilia laxa*

Particularly preferably, the pairs of fungi or bacteria vs. crop plants covered by the invention are the following:

Wheat: *Fusarium graminearum, Microdochium* and *Zymoseptoria tritici*

Grapevine: *Botrytis cinerea, Erysiphe necator, Plasmopara viticola, Guignardia bidwelli, Erisyphe necator, Dipodia seriata*

Potato: *Alternia alternata, Alternaria solani, Phytophtora infestans, Rhizoctonia solani*

Tomato: *Phytophtora infestans*

Control Process

The invention also relates to a process for controlling crop plant and seed pathogenic fungi, oomycetes and/or bacteria, comprising applying to crop plants the molecule of formula (I):

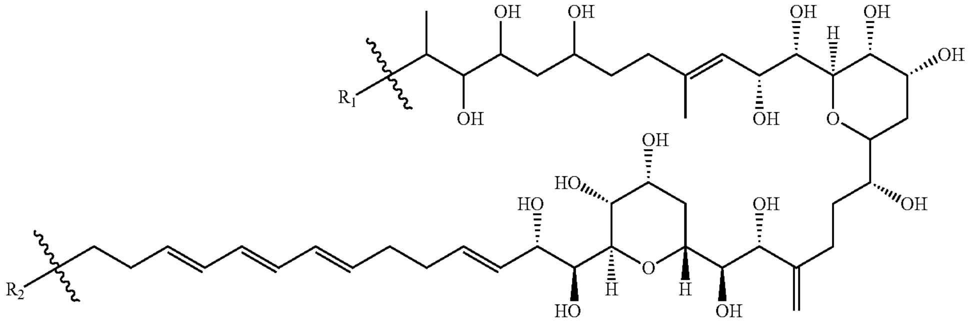
wherein:
$R_1$ is selected from the group consisting of:
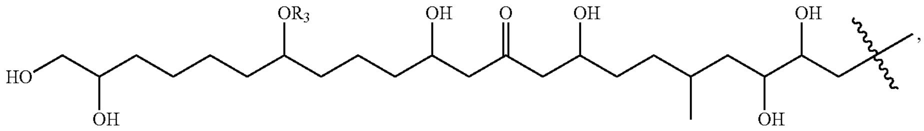
,
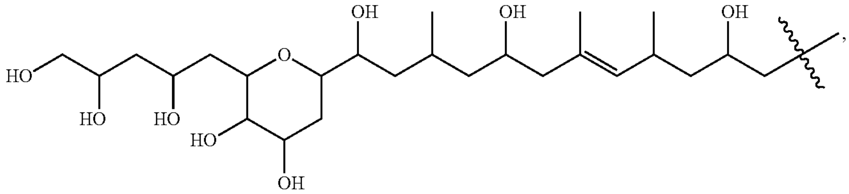
,
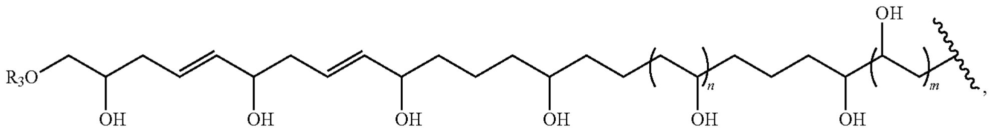
,
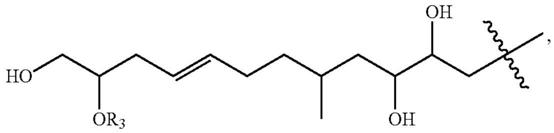
,
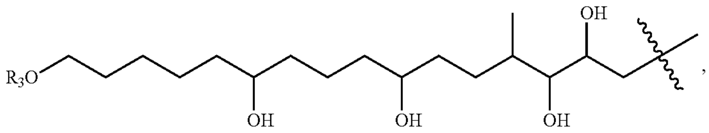
, and
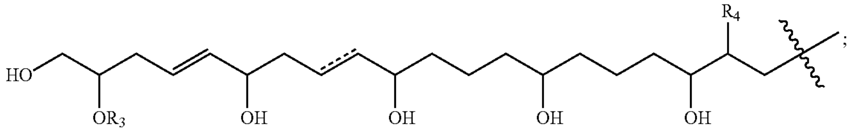
;
where:
$R_3$ represents H or $SO_3Na$,
$R_4$ is H or OH,
 represents a single or double bond,
n is equal to 0 or 1 and
m is 0 or 1; and
$R_2$ is selected from the group consisting of:
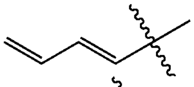
and
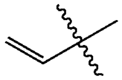
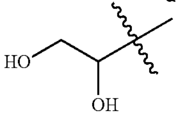

Preferably, R1 is:

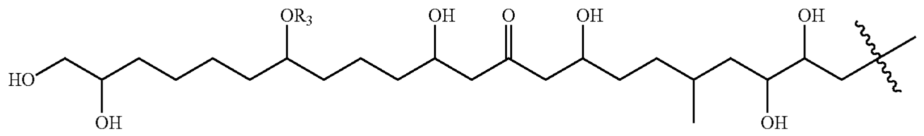

wherein $R_3$ is H or $SO_3Na$.

Preferably, $R_2$ is:

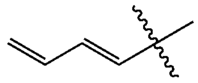 [SMILES: */C=C/C=C]

This control can be curative or preventive, preferably curative.

Application to crop plants may be carried out by any means known to the skilled person for reaching the plant parts affected by the fungus and/or bacterium.

The molecule of formula (I) is applied at a dose between 0.1 and 5 mg/mL, preferably between 0.5 and 3 mg/mL, in a particularly preferred manner between 0.75 and 1 mg/mL.

Seed coating may be carried out by any technique known to the skilled person allowing the active agent to remain in contact with the seed.

For example, coating may be carried out by powdering or spraying.

For example, the coating may comprise formulants and additives.

Formulants are used to allow the active substance(s) to be applied to and remain on the seed in equal and constant proportion throughout the product application process at very low doses.

Formulants include: organic solvents or water, dispersants, emulsifiers, surfactants or wetting agents, dyes, etc.

Surfactants and emulsifiers have the property of combining and stably maintaining together two incompatible liquids.

Various adjuvants may be applied to the seed. Film coatings correspond to the application of a microporous film to the seed surface. They do not change the shape or size of the seed. They improve the coverage and homogeneity of the treatment. When the farmer uses the seeds, they are easier to handle during sowing by suppressing dust and facilitating seed flow into the seeder. They improve the action of the active substance(s) under cultivation conditions. Coatings change the shape, size and weight of the seed. They improve sowing accuracy.

The treatment processes for controlling crop plant and seed pathogenic fungi and/or bacteria according to the invention are particularly suitable against *Fusarium* disease, preferably a *Fusarium* disease listed in Table 1.

TABLE 1

Summary of *Fusarium* diseases

| Disease name | Pathogen | EPPO code |
|---|---|---|
| *Fusarium* foot rot of asparagus | *Fusarium culmorum* | FUSACU |
| *Fusarium* foot rot of bean | *Fusarium solani* f. sp. *phaseoli* | FUSASH |

TABLE 1-continued

Summary of *Fusarium* diseases

| Disease name | Pathogen | EPPO code |
|---|---|---|
| *Fusarium* foot rot of pea | *Fusarium solani* f. sp. *pisi* | FUSASI |
| *Fusarium* wilt of sugarbeet | *Fusarium oxysporum* f. sp. *betae* | FUSABE |
| *Fusarium* wilt of potato | *Fusarium coeruleum* | FUSASC |
| *Fusarium* wilt of cabbage | *Fusarium oxysporum* f. sp. *conglutinans* | FUSACO |
| *Fusarium* stalk rot of maize | *Gibberella fujikuroi* | GIBBFU |
| *Fusarium* stalk rot of maize | *Fusarium culmorum* | FUSACU |
| *Fusarium* stalk rot of maize | *Gibberella zeae* | GIBBZE |
| *Fusarium* wilt of vanilla | *Fusarium oxysporum* f. sp. *vanillae* | FUSAVN |
| *Fusarium* wilt of pineapple | *Gibberella fujikuroi* var. *subglutinans* | GIBBFS |
| *Fusarium* head blight of maize | *Fusarium poae* | FUSAPO |
| *Fusarium* head blight of maize | *Fusarium tricinctum* | FUSATI |
| *Fusarium* wilt of carnation | *Fusarium oxysporum* f. sp. *dianthi* | FUSADI |
| *Fusarium* wilt of bromeliad | *Fusarium oxysporum* f. sp. *aechmeae* | FUSAAE |
| *Fusarium* wilt of *gladiolus* | *Fusarium oxysporum* f. sp. *gladioli* | FUSAGL |
| *Fusarium* head blight of cereals | *Fusarium culmorum* | FUSACU |
| *Fusarium* head blight of cereals | *Gibberella rosea* | FUSARO |
| *Fusarium* head blight of cereals | *Gibberella avenacea* | GIBBAV |
| *Fusarium* head blight of cereals | *Gibberella intricans* | GIBBIN |
| *Fusarium* head blight of cereals | *Monographella nivalis* | MONGNI |
| *Fusarium* ear rot | *Gibberella zeae* | GIBBZE |
| *Fusarium* root rot of asparagus | *Fusarium oxysporum* f. sp. *asparagi* | FUSAAS |
| *Fusarium* root rot of cactus | *Fusarium oxysporum* f. sp. *opuntiarum* | FUSAOP |
| *Fusarium* root and crown rot of tomato | *Fusarium oxysporum* f. sp. *radicis-lycopersici* | FUSARL |
| *Fusarium* root and crown rot of cucumber | *Fusarium oxysporum* f. sp. *cucumerinum* | FUSACC |
| *Fusarium* head blight of wheat | *Gibberella fujikuroi* | GIBBFU |
| *Fusarium* wilt of cocoa | *Albonectria rigidiuscula* | CALORI |
| *Fusarium* wilt of coffee | *Gibberella stilboides* | GIBBST |
| *Fusarium* wilt of safflower | *Fusarium oxysporum* f. sp. *carthami* | FUSACA |
| *Fusarium* wilt of quince | *Gibberella baccata* | GIBBBA |
| *Fusarium* wilt of cucurbits | *Fusarium solani* f. sp. *cucurbitae* | FUSASU |
| *Fusarium* wilt of cotton | *Fusarium oxysporum* f. sp. *vasinfectum* | FUSAVA |
| *Fusarium* wilt of *gerbera* | *Fusarium oxysporum* f. sp. *gerberae* | FUSAGE |

TABLE 1-continued

| Summary of *Fusarium* diseases | | |
|---|---|---|
| Disease name | Pathogen | EPPO code |
| *Fusarium* wilt of gladiolus | *Fusarium oxysporum* f. sp. *gladioli* | FUSAGL |
| *Fusarium* wilt of flax | *Fusarium oxysporum* f. sp. *lini* | FUSALI |
| *Fusarium* head blight of maize | *Gibberella acuminata* | GIBBAC |
| *Fusarium* head blight of maize | *Gibberella fujikuroi* var. *subglutinans* | GIBBFS |
| *Fusarium* head blight of maize | *Gibberella zeae* | GIBBZE |
| *Fusarium* wilt of palm | *Fusarium oxysporum* f. sp. *elaeidis* | FUSAEL |
| *Fusarium* wilt of soybean | *Fusarium oxysporum* f. sp. *glycines* | FUSAGY |
| *Fusarium* wilt of soybean | *Fusarium oxysporum* f. sp. *tracheiphilum* | FUSATR |
| *Fusarium* tuber rot of potato | *Gibberella cyanogena* | GIBBCN |
| *Fusarium* root rot of rice | *Gibberella fujikuroi* | GIBBFU |
| *Fusarium* snow mould | *Monographella nivalis* | MONGNI |
| *Fusarium* dieback | *Gibberella rosea* | FUSARO |
| *Fusarium* vascular wilt | *Fusarium oxysporum* | FUSAOX |
| *Fusarium* vascular wilt of lentil | *Fusarium oxysporum* f. sp. *lentis* | FUSALE |
| *Fusarium* vascular wilt of watermelon | *Fusarium oxysporum* f. sp. *niveum* | FUSANV |
| *Fusarium* vascular wilt of tomato | *Fusarium oxysporum* f. sp. *lycopersici* | FUSALY |
| *Fusarium* vascular wilt of tulip | *Fusarium oxysporum* f. sp. *tulipae* | FUSATU |
| *Fusarium* vascular wilt of crucifers | *Fusarium oxysporum* f. sp. *conglutinans* | FUSACO |
| *Fusarium* vascular wilt of coffee | *Gibberella xylarioides* | GIBBXY |
| *Fusarium* vascular wilt of cabbage | *Fusarium oxysporum* f. sp. *conglutinans* | FUSACO |
| *Fusarium* vascular wilt of *chrysanthemum* | *Fusarium oxysporum* f. sp. *chrysanthemi* | FUSACH |
| *Fusarium* vascular wilt of cucumber | *Fusarium oxysporum* f. sp. *cucumerinum* | FUSACCC |
| *Fusarium* vascular wilt of *cyclamen* | *Fusarium oxysporum* var. *aurantiacum* | FUSAAU |
| *Fusarium* vascular wilt of strawberry | *Fusarium oxysporum* f. sp. *fragariae* | FUSAFR |
| *Fusarium* vascular wilt of bean | *Fusarium oxysporum* f. sp. *phaseoli* | FUSAPH |
| *Fusarium* vascular wilt of melon | *Fusarium oxysporum* f. sp. *melonis* | FUSAME |
| *Fusarium* vascular wilt of pea | *Fusarium oxysporum* f. sp. *pisi* | FUSAPI |
| *Fusarium* vascular wilt of chickpea | *Gibberella baccata* | GIBBBA |
| *Fusarium* vascular wilt of chickpea | *Fusarium oxysporum* f. sp. *ciceris* | FUSACI |
| *Fusarium* vascular wilt of radish | *Fusarium oxysporum* f. sp. *raphani* | FUSARA |

The treatment processes for controlling crop plant and seed pathogenic fungi, oomycetes and/or bacteria according to the invention are particularly suitable for the following pairs of fungi or bacteria vs. crop plants:

Wheat: *Fusarium graminearum, Microdochium nivale* and *Zymoseptoria tritici*

Grapevine: *Botrytis cinerea, Plasmopara viticola, Guignardia bidwelli, Erisyphe necator, Diplodia seriata*

Apple tree: *Venturia inaequalis*

Banana tree: *Fusarium oxysporum* and *Mycosphaerella fijiensis*

EXAMPLES

Materials & Methods

Example 1: Microalgae Culture

The microalga *Amphidinium carterae*, strain AC208, comes from Algobank (Caen) and the microalgae *Prymnesium parvum*, strain RCC 1436, and *Phaeodactylum tricornutum*, strain CCMP 632, come from the Roscoff marine microorganism bank (RCC: Roscoff Culture Collection). These microalgae are cultivated in L1 artificial seawater (https://ncma.bigelow.org/algal-recipes) at 19° C. with a 12 h/12 h day/night cycle. The light intensity used is 100 μE. Biomass is recovered at the end of the exponential growth phase by centrifugation (15 min at 3000 RPM). The resulting cell pellet is frozen and then freeze-dried using a laboratory freeze-dryer (Alpha 1-2 LDplus, Labconco) for stable long-term preservation of the active substance. After freeze-drying, the dry matter is weighed.

Example 2: Preparation of the Extract

In order to extract the active substance from the dry matter of Example 1, 20 mg of dry matter is resuspended in 1 mL of distilled water at 100° C. After incubation for 2 minutes at room temperature (20-25° C.) the extract is stored in ice and then centrifuged for 5 min at 10 000 RPM at room temperature. The supernatant containing the active substance is frozen in liquid nitrogen for long-term preservation of its antifungal properties.

Example 3: *Fusarium graminearum* Germination Test

*Fusarium graminearum* spores are grown in “mung bean” depleted medium. Spores are separated from the mycelium by filtration on Miracloth (Calbiochem), centrifuged and then resuspended at $1 \cdot 6 \cdot 10^6$ spores/mL. Approximately 16 000 spores are incubated in the presence of the control solution or the *A. carterae* extract at various concentrations. After incubation for 10 min at room temperature, the spores are placed on a slide for a germination count after 6 hours or on a petri dish for an observation of mycelium growth after 72 hours.

Tests

Example 4: HPLC Fractionation of Extract D and Test of Antifungal Activity of the Different Fractions Obtained In an attempt to characterize which molecules present in the *A. carterae* extract are responsible for antifungal activity, the bioguided fractionation strategy was selected: the *A. carterae* extract is fractionated on an HPLC column and tests of biocidal activity against *F. graminearum* spores are performed for each fraction to determine which fraction contains the molecule(s) responsible for the antifungal activity.

200 mg of freeze-dried cells are solubilized in 1 mL of methanol. After centrifugation for 10 min at 4400 rpm, the supernatant is recovered and the total alcohol liquid phase recovered is filtered on paper, the solution is then evaporated in a rotary evaporator at low temperature to collect 48.5 mg of extracted product. An activity test is performed on *F. graminearum* spores to confirm the activity of the *A. carterae* extract (FIG. 1A).

The extract being active, semi-preparative fractionation experiments were performed on a reversed-phase C18 column using a Thermo Scientific Ultimate 3000 high-performance liquid chromatograph according to the following protocol:

The *A. carterae* extract was dissolved at 5 g/L in methanol. The following conditions were applied for the extract:

Flow rate: 2.5 mL/min.

Column: reversed-phase $C_{18}$: L=250 mm; I.D.=10 mm; P.D.=5 μm.

Injection volume: 150 μL.

Injection temperature: 24° C.

Detection wavelength: 280 nm.

Gradient programme described in Table 7 below.

TABLE 2

Optimal semi-preparative solvent gradient programme.

| Time (min) | Solvent A (%) | Solvent B (%) |
|---|---|---|
| 0 | 50 | 50 |
| 25 | 0 | 100 |
| 40 | 0 | 100 |
| 43 | 50 | 50 |
| 48 | 50 | 50 |

Solvent A: Milli-Q water + 0.1% formic acid; Solvent B: Methanol.

The chromatogram obtained under these conditions is presented in FIG. 1B. Five fractions, F1 to F5, were formed, as described in FIG. 1B, so that each majority peak corresponds to a fraction. Activity tests on *F. graminearum* growth were performed with 5 mg/ml of each fraction. The results indicate that only fraction F1 still has biocidal activity (FIG. 1C); an MIC of 0.75 mg/ml was determined for this fraction (FIG. 1D).

Fraction F1 was subjected to a new fractionation according to the following protocol:

Extract F1 was dissolved at 5 g/L in methanol. The following conditions were applied for extract D:

Flow rate: 2.5 mL/min.

Column: reversed-phase $C_{18}$: L=250 mm; I.D.=10 mm; P.D.=5 μm.

Injection volume: 150 pt.

Injection temperature: 24° C.

Detection wavelength: 280 nm.

Gradient programme described in Table 8 below

TABLE 3

Optimal semi-preparative solvent gradient program.

| Time (min) | Solvent A (%) | Solvent B (%) |
|---|---|---|
| 0 | 30 | 70 |
| 10 | 15 | 85 |
| 15 | 15 | 85 |
| 25 | 0 | 100 |
| 30 | 0 | 100 |
| 32 | 30 | 70 |
| 35 | 30 | 70 |

Solvent A: Milli-Q water + 0.1% formic acid; Solvent B: Methanol.

The chromatogram obtained under these conditions is presented in FIG. 2A. Five fractions, F1-1 to F1-5, were formed, as described in FIG. 2A, the majority peak corresponding to fraction F1-2. Activity tests on *F. graminearum* growth were performed with 5 mg/ml of each fraction. The results indicate that only fractions F1-2 and F1-3 have biocidal activity (FIG. 2B); an MIC of 0.75 mg/ml was determined for fraction F1-2 (FIG. 2C).

Example 5: Mass Spectrometric Analysis of Fraction F1-2

To better characterize the molecule present in fraction F1-2, a mass spectrometric analysis was performed under the following conditions:

The experiments were performed in infusion mode on a QStar Elite spectrometer (Applied Biosystems).

Ionization mode: Positive-mode electrospray (ESI)

Electrospray needle voltage: 4500 V at room temperature

Injection conditions: 20 μL of sample dissolved in methanol, with a methanol flow rate of 400 μL/min Scan range: 100 to 2000 daltons FIG. 3A shows the mass spectrum acquired by positive-mode electrospray ionization on the molecule of interest collected F1-2.

The exact mass determined is 1381.8276 Daltons. It corresponds to a sodium adduct formed during ionization ($[M+Na]^+$). After subtracting the mass of sodium, 23 daltons, the mass of the molecular peak of the compound is 1358.8 Da.

A thorough analysis of the exact mass makes it possible to determine one or more empirical formulas related to this mass, with an error of 5 ppm. After rejecting unrealistic proposals, the empirical formula selected is $C_{71}H_{122}O_{24}$.

A thorough analysis by tandem mass spectrometry was performed on this peak at 1381.8276 Da. The mass spectrum is presented in FIG. 3B. Several peaks (circled peaks—FIG. 3B) are similar to the peaks resulting from the fragmentation of amphidinol 18 (7).

Example 6: Nuclear Magnetic Resonance (NMR) Analysis of Fraction F1-2

To determine the structure of the molecule with a molecular weight of 1358.8 Da, an NMR analysis was performed according to the following procedure:

Samples corresponding to peak F1-2 were collected and then completely dissolved in about 350 μL of deuterated methanol ($MeOD_4$).

The experiments were performed on a Bruker Avance 14.1T spectrometer equipped with a multinuclear probe. One- and two-dimensional proton and carbon spectra were acquired using pulse sequences available from the Bruker sequence library.

The acquisition conditions are as follows:

$^1H$: Number of scans: 512; Pulse: 8 μs; Acquisition: 5.0 s; Relaxation: 1.0 s $^{13}C$ DEPT135: Number of scans: 44666; Pulse: 12 μs; Acquisition: 1.0 s; Relaxation: 3.0 s HSQC: Number of scans: 64; 512 increments HMBC: Number of scans: 48; 512 increments COSY: Number of scans: 56; 256 increments TOCSY: Number of scans: 48; 256 increments The $^{13}C$ DEPT135 sequence is an experiment for sorting carbons according to the number of directly bound protons: $CH_3$ and CH>0 and $CH_2$<0.

The correlation spectroscopy (COSY) sequence is a 2D homonuclear experiment for identifying protons in scalar interaction spaced 2 or 3 bonds apart.

The total correlation spectroscopy (TOCSY) sequence is a 2D homonuclear experiment for identifying protons in scalar interaction spaced 3 or more bonds apart.

The heteronuclear single quantum correlation (HSQC) sequence is a 2D heteronuclear experiment that shows the direct interactions between a carbon and the directly linked proton(s).

The heteronuclear multiple bond correlation (HMBC) sequence is a 2D heteronuclear experiment that shows the correlations between protons and carbons separated by intervals of 2 or 3 bonds.

The 1D spectra were processed by a Fourier transform. The spectra were processed by a Fourier transform in both dimensions.

Based on the results obtained, the acquired $^1H$ spectrum, shown in FIG. 4A, shows a series of peaks distributed over a large spectral window comprised between 1 and 6 ppm. This confirms that the compound studied contains aliphatic and olefinic protons. These shifts also suggest the presence of heteroatoms such as oxygen.

The $^{13}C$ DEPT135 spectrum (FIG. 4B) shows a series of peaks in the spectral window comprised between 13 and 211 ppm. The HMBC and HSQC 2D sequences show how the carbons are chained together. The COSY and TOCSY 2D sequences confirm the structural sequence based on proton shifts and correlations.

The number of unsaturations and rings observed is consistent with that calculated for the molecule on the basis of its empirical formula (=11):

$$N_i=(2n_C+2-n_H+n_N-n_X)/2$$

With: $n_C$: the number of carbon atoms, $n_N$: the number of hydrogen atoms, $n_N$: the number of nitrogen atoms, $n_X$: the number of halogen atoms.

The 11 unsaturations are distributed as follows:

1 ketone function 8 double bonds, including 2 chain-end 2 rings

The COSY and TOCSY sequences made it possible to reconstruct the entire carbon skeleton of the structure. These correlations are indicated by links in bold in FIG. 5. These results show that the secondary structure of the molecule corresponds to that of amphidinol 18. The overall interpretation was confirmed by comparing the results obtained in this study with those found in the literature (7).

In conclusion, all results obtained by nuclear magnetic resonance and mass spectrometry confirm that the molecule present in fraction F1-2, obtained after fractionation of extract D, and which has antifungal activity against *F. graminearum*, is the amphidinol 18 molecule whose specific chemical data are as follows:

Empirical formula: $C_{71}H_{122}O_{24}$

Molar mass: 1358.83 $g\cdot mol^{-1}$

REFERENCES (1) Arseniuk, E., Foremska, E., Goral, T., Chelkowski, J. 1999. *Fusarium* head blight reactions and accumulation of deoxynivalenol (DON) and some of its derivatives in kernels of wheat, triticale and rye. Journal of Phytopathology 147, 577-590

(2) Devi P, Wahidulla S, Kamat T and D'Souza L (2011). Screening marine organisms for antimicrobial activity against clinical pathogens. Indian J. Geomar. Sci. (40) 338-346.

(3) Mayer A M, Rodriguez A D, Taglialatela-Scafati O, Fusetani N (2013). Marine pharmacology in 2009-2011: marine compounds with antibacterial, antidiabetic, antifungal, anti-inflammatory, antiprotozoal, antituberculosis, and antiviral activities; affecting the immune and nervous systems, and other miscellaneous mechanisms of action. Mar Drugs. 11(7):2510-73

(4) Bowler, C., Vardi, A., & Allen, A. E. (2010). Oceanographic and biogeochemical insights from diatom genomes. Annual Review of Marine Science, 2, 333-65. doi:10.1146/annurev-marine-120308-081051

(5) Murray S, Garby T, Hoppenrath M, Neilan B A (2012). Genetic diversity, morphological uniformity and polyketide production in dinoflagellates (*Amphidinium, Dinoflagellata*). PLoS One. 7(6)

(6) Morsy N, Houdai T, Matsuoka S, Matsumori N, Adachi S, et al. (2006). Structures of new amphidinols with truncated polyhydroxyl chain and their membrane-permeabilizing activities. Bioorganic and Medicinal Chemistry 14: 6548-6554.

(7) Nuzzo G, Cutignano A, Sardo A, Fontana A, 2014 Jun. 27, J Nat Prod, Antifungal Amphidinol 18 and its 7-sulfate derivative from marine dinoflagellate *Amphidinium carterae.*

The invention claimed is:

1. A process for controlling one or more *Fusarium* diseases in a crop plant, said method comprising identifying a crop plant or crop seed that is infected with or at risk of infection with one or more *Fusarium* diseases, and applying to said crop plant or crop seed a molecule of formula (I) having the following structure:

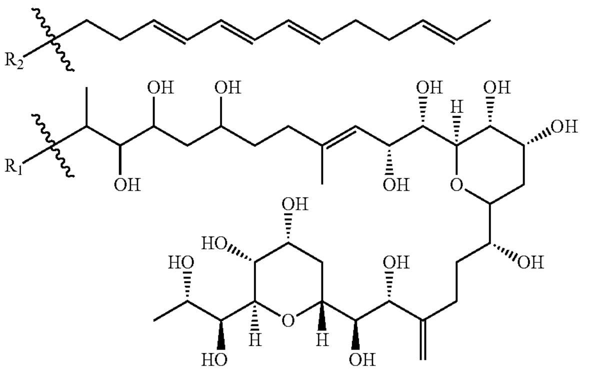

wherein:

$R_1$ is selected from the group consisting of:

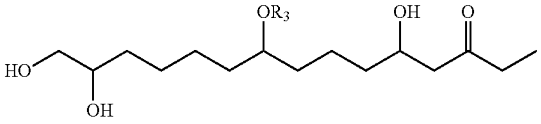

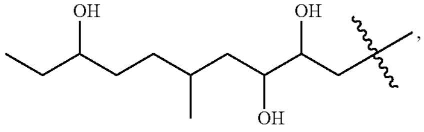,

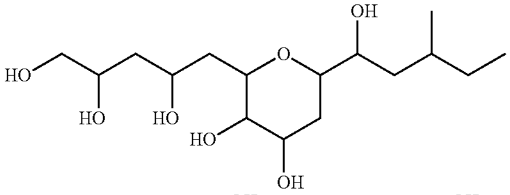

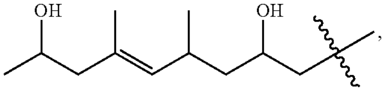,

-continued

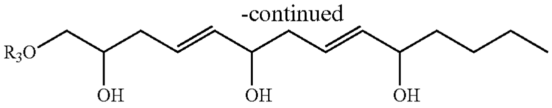

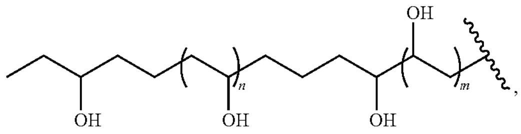
,

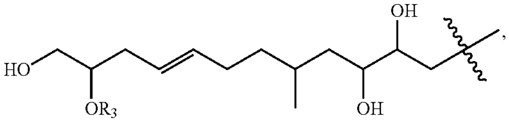
,

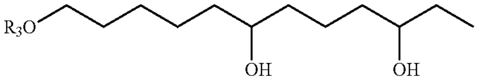

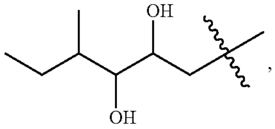
, and

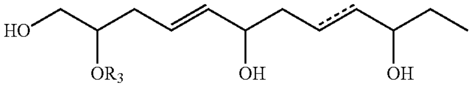

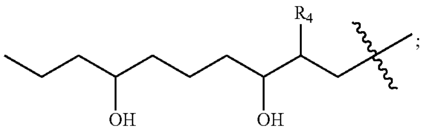
;

where:

$R_3$ represents H or $SO_3Na$, $R_4$ is H or OH,

 represents a single or double bond, n is equal to 0 or 1 and m is 0 or 1; and $R_2$ is selected from the group consisting of:

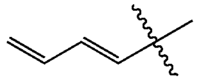
and
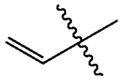

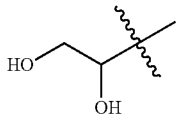
.

2. The process according to claim 1, wherein the molecule of formula (I) is applied at a concentration between 0.1 and 5 mg/mL.

3. The process according to claim 1, wherein the molecule of formula (I) is applied at a concentration between 0.5 and 3 mg/mL.

4. The process according to claim 1, wherein the molecule of formula (I) is applied at a concentration between 0.75 and 1 mg/mL.

5. The process according to claim 1 wherein $R_1$ is:

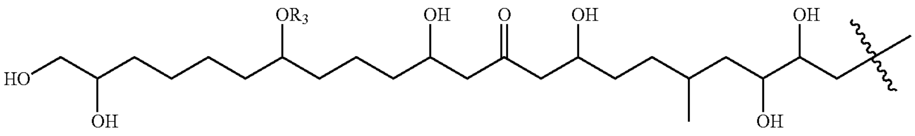

wherein $R_3$ is H or $SO_3Na$.

6. The process according to claim 1, wherein $R_2$ is:

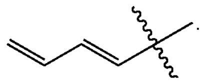 [SMILES: */C=C/C=C]
.

7. A process for controlling one or more *Fusarium* diseases in a crop plant, said method comprising identifying a crop plant or crop seed that is infected with or at risk of infection with one or more *Fusarium* diseases, and applying to said crop plant or crop seed a molecule of amphidinol having the following structure:

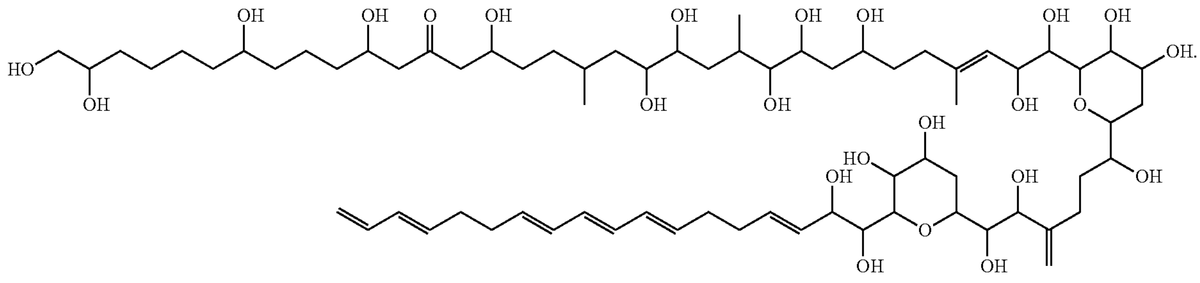 [SMILES: C=C/C=C/CC/C=C/C=C/C=C/CC/C=C/C(O)C(O)C1OC(C(O)C(O)C(=C)CCC(O)C2CC(O)C(O)C(C(O)C(O)/C=C(\C)CCC(O)CC(O)C(O)C(C)CC(O)C(O)CC(C)CCC(O)CC(=O)CC(O)CCCC(O)CCCCC(O)CO)O2)CC(O)C1O]

8. The process according to claim 1, wherein the molecule of formula (I) is extracted from cells of one or more microalgae of the genus *Amphidinium*.

9. The process according to claim 8, wherein the molecule of formula (I) is extracted from *Amphidinium carterae* cells.

10. The process according to claim 1, wherein said one or more *Fusarium* diseases are caused by infection of the crop plant by one or more pathogenic fungi selected from the group consisting of *Fusarium oxysporum, Fusarium solani, Fusarium culmorum, Fusarium poae, Fusarium tricinctum, Fusarium coeruleum, Gibberella fujikuroi, Gibberella zeae, Gibberella rosea, Gibberella intricans, Gibberella stilboides, Gibberella baccata, Gibberella acuminata, Gibberella cyanogens, Gibberella xylarioides,* and *Albonectria rigidiuscula.*

* * * * *